US012356331B2

(12) United States Patent
Xue et al.

(10) Patent No.: US 12,356,331 B2
(45) Date of Patent: Jul. 8, 2025

(54) SEARCH SPACE MONITORING METHOD AND APPARATUS

(71) Applicant: Huawei Technologies Co., Ltd., Shenzhen (CN)

(72) Inventors: Yifan Xue, Beijing (CN); Haibo Xu, Beijing (CN); Yiru Kuang, Beijing (CN); Jian Wang, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 776 days.

(21) Appl. No.: 17/621,995

(22) PCT Filed: Jun. 5, 2020

(86) PCT No.: PCT/CN2020/094625
§ 371 (c)(1),
(2) Date: Dec. 22, 2021

(87) PCT Pub. No.: WO2020/259254
PCT Pub. Date: Dec. 30, 2020

(65) Prior Publication Data
US 2022/0377670 A1 Nov. 24, 2022

(30) Foreign Application Priority Data

Jun. 28, 2019 (CN) .......................... 201910580389.4
Sep. 12, 2019 (CN) .......................... 201910866531.1

(51) Int. Cl.
H04W 52/02 (2009.01)
H04W 76/28 (2018.01)
(52) U.S. Cl.
CPC ... *H04W 52/0235* (2013.01); *H04W 52/0216* (2013.01); *H04W 76/28* (2018.02)

(58) Field of Classification Search
CPC ......... H04W 52/0235; H04W 52/0216; H04W 76/28; H04W 52/0229; H04W 52/0248; Y02D 30/70
See application file for complete search history.

(56) References Cited

U.S. PATENT DOCUMENTS

2015/0003311 A1  1/2015  Feuersaenger et al.
2020/0214078 A1  7/2020  Jiang et al.
(Continued)

FOREIGN PATENT DOCUMENTS

CN  104205993 A  12/2014
CN  109429310 A  3/2019
(Continued)

OTHER PUBLICATIONS

R1-1809333, Huawei et al, "General considerations on UE power saving in Rel-16," 3GPP TSG RAN WG1 Meeting #94, Gothenburg, Sweden, Aug. 20-24, 2018, 5 pages.
(Continued)

Primary Examiner — Joseph E Dean, Jr.
(74) Attorney, Agent, or Firm — Conley Rose, P.C.

(57) ABSTRACT

A search space monitoring method allows a terminal to monitor a power saving signal in a search space in a scenario in which the power saving signal can be applied to a long discontinuous reception (DRX) cycle and a short DRX cycle. The method includes, when using the long DRX cycle, monitoring, by the terminal, the power saving signal in a first search space, and skipping monitoring the power saving signal in a second search space, where the power saving signal indicates power saving information of the terminal; and when using a short DRX cycle, monitoring, by the terminal, the power saving signal in the second search space, and skipping monitoring the power saving signal in the first search space.

20 Claims, 15 Drawing Sheets

(56) References Cited

U.S. PATENT DOCUMENTS

| | | | |
|---|---|---|---|
| 2020/0245333 A1* | 7/2020 | Lin | H04L 1/0026 |
| 2021/0329481 A1 | 10/2021 | Xue et al. | |
| 2021/0337510 A1 | 10/2021 | Shen | |
| 2021/0377854 A1 | 12/2021 | Hwang et al. | |

FOREIGN PATENT DOCUMENTS

| | | |
|---|---|---|
| CN | 109644465 A | 4/2019 |
| CN | 110622579 A | 12/2019 |
| CN | 110831185 A | 2/2020 |
| WO | 2019059674 A1 | 3/2019 |
| WO | 2019099880 A1 | 5/2019 |

OTHER PUBLICATIONS

R1-1813243, InterDigital, Inc., "Discussion on Power Saving Techniques," 3GPP TSG RAN WG1 Meeting #95, Spokane, USA, Nov. 12-16, 2018, 5 pages.

R1-1903988, Huawei, et al, "PDCCH Based Power Saving Signal/Channel," 3GPP TSG RAN WG1 Meeting #96bis, Xi'an, China, Apr. 8-12, 2019, 7 pages.

R1-1904635, LG Electronics, "Discussion on PDCCH-based power saving signal/channel," 3GPP TSG RAN WG1 Meeting #96bis, Xi'an, China, Apr. 8-12, 2019, 3 pages.

R1-1906980, Samsung, "PDCCH-based power saving signal/channel," 3GPP TSG RAN WG1 #97, Reno, USA, May 13-17, 2019, 12 pages.

Tdoc R1-1907322, Ericsson, "Design of PDCCH-based power saving signal/channel," 3GPP TSG-RAN WG1 Meeting #97, Reno, USA, May 13-17, 2019, 9 pages.

R1-1907711, CATT, "Summary of PDCCH-based Power Saving Signal/Channel," 3GPP TSG RAN WG1 #97, Reno, China, May 13-17, 2019, 8 pages.

Tdoc R2-1810059, Revision of R2-1807021, Ericsson, "PDCCH monitoring and duplex mode operation," 3GPP TSG-RAN WG2 AH 1807, Montreal, Canada, Jul. 2-6, 2018, 4 pages.

R1-1902025, Catt et al, "UE Power saving schemes and power saving signal/channel, " 3GPP TSG RAN WG1 Meeting #96, Athens, Greece, Feb. 25-Mar. 1, 2019, 25 pages.

R1-1905368, Catt et al, PDCCH based power saving signal/channel design, 3GPP TSG RAN WG1 #96bis, Xi'an, China, Apr. 8-12, 2019, 8 pages.

3GPP TS 38.213 V15.6.0, Jun. 2019, "3rd Generation Partnership Project; Technical Specification Group Radio Access Network; NR; Physical layer procedures for control (Release 15)," 107 pages.

3GPP TS 38.321 V15.5.0, Mar. 2019, "3rd Generation Partnership Project; Technical Specification Group Radio Access Network; NR; Medium Access Control (MAC) protocol specification (Release 15)," 78 pages.

3GPP TS 38.331 V15.5.1, Apr. 2019, "3rd Generation Partnership Project; Technical Specification Group Radio Access Network; NR; Radio Resource Control (RRC) protocol specification (Release 15)," 491 pages.

Nokia, Nokia Shanghai Bell, PDCCH-based power saving signal/channel [online], 3GPP TSG RAN WG1 #97 R1-1907375, May 3, 2019, 9 pages.

OPPO, Discussion on PDCCH-based power saving signal/channel [online], 3GPP TSG RAN WG1 #97 R1-1906579, May 3, 2019, 11 pages.

* cited by examiner

SEARCH SPACE MONITORING METHOD AND APPARATUS

CROSS-REFERENCE TO RELATED APPLICATIONS

This is a U.S. National Stage of International Patent Application No. PCT/CN2020/094625 filed on Jun. 5, 2020, which claims priority to Chinese Patent Application No. 201910866531.1 filed on Sep. 12, 2019 and Chinese Patent Application No. 201910580389.4 filed on Jun. 28, 2019. All of the aforementioned applications are hereby incorporated by reference in their entireties.

TECHNICAL FIELD

This application relates to the field of communications technologies, and in particular, to a search space monitoring method and an apparatus.

BACKGROUND

To reduce power consumption of a terminal, a discontinuous reception (discontinuous reception. DRX) technology is introduced in a communications system. In a connected DRX technology, a DRX cycle is configured for a terminal in radio resource control (radio resource control, RRC) connected (connected) mode. As shown in FIG. 1, the DRX cycle includes opportunity for DRX (opportunity for DRX) and on duration (on duration). In the on duration, the terminal monitors and receives a physical downlink control channel (physical downlink control channel, PDCCH). In the opportunity for DRX, the terminal does not receive data of a downlink channel, so as to reduce power consumption. It should be noted that the DRX cycle may be classified into a short DRX cycle and a long DRX cycle.

Currently, the terminal needs to monitor a PDCCH-based power saving signal at a specific location in the DRX cycle. In addition, the power saving signal may be applied to the long DRX cycle and the short DRX cycle. In this way, for the terminal, a cycle for monitoring the power saving signal in the long DRX cycle is different from a cycle for monitoring the power saving signal in the short DRX cycle.

In the conventional technology, a search space monitoring cycle is fixed. Consequently, a search space used to carry a power saving signal cannot be applied to both a long DRX cycle and a short DRX cycle, and a terminal cannot normally monitor the power saving signal. The industry has not provided a corresponding solution to this technical problem.

SUMMARY

This application provides a search space monitoring method and an apparatus, so that a terminal can normally monitor a power saving signal in a search space in a scenario in which the power saving signal can be applied to a long DRX cycle and a short DRX cycle.

According to a first aspect, a search space monitoring method is provided, including: When using a long DRX cycle, a terminal monitors a power saving signal in a first search space, and does not monitor the power saving signal in a second search space, where the power saving signal is used to indicate power saving information of the terminal. When using a short DRX cycle, the terminal monitors the power saving signal in the second search space, and does not monitor the power saving signal in the first search space.

Based on the foregoing technical solution, when using the long DRX cycle, the terminal monitors the power saving signal in the first search space, and does not monitor the power saving signal in the second search space. When using the short DRX cycle, the terminal monitors the power saving signal in the second search space, and does not monitor the power saving signal in the first search space. In this way, the terminal can normally monitor the power saving signal in the search space in a scenario in which the power saving signal can be applied to the long DRX cycle and the short DRX cycle. In addition, regardless of the long DRX cycle or the short DRX cycle, the terminal needs to monitor the power saving signal in only one search space, so that a quantity of search spaces that the terminal needs to monitor is reduced, and power consumption of the terminal is reduced.

According to a second aspect, a communications method is provided, including: When a terminal uses a long DRX cycle, a network device sends a power saving signal in a first search space, and does not send the power saving signal in a second search space, where the power saving signal is used to indicate power saving information of the terminal. When the terminal uses a short DRX cycle, the network device sends the power saving signal in the second search space, and does not send the power saving signal in the first search space.

Based on the foregoing technical solution, in a scenario in which the power saving signal can be applied to the long DRX cycle and the short DRX cycle, the network device determines, based on a type of a DRX cycle used by the terminal, a search space for carrying the power saving signal. Therefore, the network device sends the power saving signal only in a search space matching the DRX cycle used by the terminal, so that the terminal can detect the power saving signal in the corresponding search space, thereby scheduling power saving of the terminal by using the power saving signal. In addition, when the network device configures two search spaces (that is, the first search space and the second search space) for the terminal, in the technical solution of this application, because the network device sends the power saving signal in only one search space in one DRX cycle, correspondingly, the terminal also monitors the power saving signal in only one search space, thereby avoiding a conventional-technology problem of unnecessary power consumption caused because the terminal needs to monitor the two search spaces simultaneously.

According to a third aspect, a search space monitoring method is provided, including: When using a long DRX cycle, a terminal monitors a power saving signal in a search space based on a first group of configuration parameters of the search space, where the power saving signal is used to indicate power saving information of the terminal. When using a short DRX cycle, the terminal monitors the power saving signal in the search space based on a second group of configuration parameters of the search space.

Based on the foregoing technical solution, when using the long DRX cycle, the terminal uses the first group of configuration parameters of the search space, to meet a requirement of the terminal for a cycle of monitoring the power saving signal in the long DRX cycle. When using the short DRX cycle, the terminal uses the second group of configuration parameters of the search space, to meet a requirement of the terminal for a cycle of monitoring the power saving signal in the short DRX cycle. In other words, in a scenario in which the power saving signal can be applied to the long DRX cycle and the short DRX cycle, for a different DRX cycle, the terminal may use a group of configuration parameters corresponding to the DRX cycle, to ensure that the terminal can normally monitor the power saving signal in the search space.

According to a fourth aspect, a communications method is provided, including: When a terminal uses a long DRX cycle, a network device sends a power saving signal in a search space based on a first group of configuration parameters of the search space, where the power saving signal is used to indicate power saving information of the terminal. When the terminal uses a short DRX cycle, the network device sends the power saving signal in the search space based on a second group of configuration parameters of the search space.

Based on the foregoing technical solution, in a scenario in which the power saving signal can be applied to the long DRX cycle and the short DRX cycle, the network device determines a corresponding group of configuration parameters of the search space based on a type of a DRX cycle used by the terminal, so that a monitoring cycle of the search space can match the type of the DRX cycle used by the terminal. In this way, the network device sends the power saving signal in the search space. Correspondingly, the terminal can normally monitor the power saving signal in the search space.

According to a fifth aspect, a search space monitoring method is provided, including: A terminal determines M candidate monitoring occasions (monitoring occasion) of a search space, where M is a positive integer. The terminal determines N target monitoring occasions from the M candidate monitoring occasions based on a time domain location of on duration of a DRX cycle, where N is a positive integer less than or equal to M. The terminal monitors a power saving signal on the N target monitoring occasions in the search space, where the power saving signal is used to indicate power saving information of the terminal.

Based on the foregoing technical solution, the terminal determines the target monitoring occasion based on the time domain location of the on duration of the DRX cycle. To be specific, when the terminal uses a long DRX cycle, the terminal may determine the target monitoring occasion based on a time domain location of on duration of the long DRX cycle. When the terminal uses a short DRX cycle, the terminal may determine the target monitoring occasion based on a time domain location of on duration of the short DRX cycle. The target monitoring occasion determined by the terminal is adapted to a type of a DRX cycle used by the terminal. In this way, regardless of the long DRX cycle or the short DRX cycle, the terminal can normally monitor the power saving signal in the search space on a proper monitoring occasion (that is, the target monitoring occasion).

In a possible design, a monitoring cycle of the search space is the same as a short DRX cycle in terms of a time length. In this way, complexity of determining the target monitoring occasion by the terminal is reduced.

According to a sixth aspect, a communications method is provided, including: A network device determines M candidate monitoring occasions of a search space, where M is a positive integer. The network device determines N target monitoring occasions from the M candidate monitoring occasions based on a time domain location of on duration of a DRX cycle, where N is a positive integer less than or equal to M. The network device sends a power saving signal on the N target monitoring occasions in the search space, where the power saving signal is used to indicate power saving information of a terminal.

Based on the foregoing technical solution, in a scenario in which the power saving signal can be applied to a long DRX cycle and a short DRX cycle, when the terminal uses the long DRX cycle, the network device determines the target monitoring occasion based on a time domain location of on duration of the long DRX cycle. When the terminal uses the short DRX cycle, the network device determines the target monitoring occasion based on a time domain location of on duration of the short DRX cycle. The target monitoring occasion determined by the network device is adapted to a type of a DRX cycle used by the terminal. The network device sends the power saving signal on the target monitoring occasion, so that the terminal can normally monitor the power saving signal on the target monitoring occasion.

According to a seventh aspect, a communications apparatus is provided. The communications apparatus may be a terminal, a chip in the terminal, or a system on chip. The communications apparatus includes a processor and a memory. The memory stores instructions. When the instructions are executed by the processor, the communications apparatus is enabled to perform the following steps: when using a long DRX cycle, monitoring a power saving signal in a first search space, and skipping monitoring the power saving signal in a second search space, where the power saving signal is used to indicate power saving information of the terminal; and when using a short DRX cycle, monitoring the power saving signal in the second search space, and skipping monitoring the power saving signal in the first search space.

According to an eighth aspect, a communications apparatus is provided. The communications apparatus may be a network device, a chip in the network device, or a system on chip. The communications apparatus includes a processor and a memory. The memory stores instructions. When the instructions are executed by the processor, the communications apparatus is enabled to perform the following steps: when a terminal uses a long DRX cycle, sending a power saving signal in a first search space, and skipping sending the power saving signal in a second search space, where the power saving signal is used to indicate power saving information of the terminal; and when the terminal uses a short DRX cycle, sending the power saving signal in the second search space, and skipping sending the power saving signal in the first search space.

According to a ninth aspect, a communications apparatus is provided. The communications apparatus may be a terminal, a chip in the terminal, or a system on chip. The communications apparatus includes a processor and a memory. The memory stores instructions. When the instructions are executed by the processor, the communications apparatus is enabled to perform the following steps: when using a long DRX cycle, monitoring a power saving signal in a search space based on a first group of configuration parameters of the search space, where the power saving signal is used to indicate power saving information of the terminal; and when using a short DRX cycle, monitoring the power saving signal in the search space based on a second group of configuration parameters of the search space.

In a possible design, when the instructions are executed by the processor, the communications apparatus is further enabled to perform the following step: receiving configuration information of the search space, where the configuration information of the search space is used to indicate the first group of configuration parameters and the second group of configuration parameters.

In a possible design, when the instructions are executed by the processor, the communications apparatus is further enabled to perform the following steps: receiving configuration information of the search space, where the configuration information of the search space is used to indicate a parameter other than a monitoring cycle and a monitoring offset value in the first group of configuration parameters, and a parameter other than a monitoring cycle and a monitoring offset value in the second group of configuration parameters; and receiving indication information, where the indication information is used to indicate the monitoring cycle and the monitoring offset value in the first group of configuration parameters, and the monitoring cycle and the monitoring offset value in the second group of configuration parameters.

According to a tenth aspect, a communications apparatus is provided. The communications apparatus may be a network device, a chip in the network device, or a system on chip. The communications apparatus includes a processor and a memory. The memory stores instructions. When the instructions are executed by the processor, the communications apparatus is enabled to perform the following steps: when a terminal uses a long DRX cycle, sending a power saving signal in a search space based on a first group of configuration parameters of the search space, where the power saving signal is used to indicate power saving information of the terminal; and when the terminal uses a short DRX cycle, sending the power saving signal in the search space based on a second group of configuration parameters of the search space.

In a possible design, when the instructions are executed by the processor, the communications apparatus is further enabled to perform the following step: sending configuration information of the search space to the terminal, where the configuration information of the search space is used to indicate the first group of configuration parameters and the second group of configuration parameters.

In a possible design, when the instructions are executed by the processor, the communications apparatus is further enabled to perform the following steps: sending configuration information of the search space to the terminal, where the configuration information of the search space is used to indicate a parameter other than a monitoring cycle and a monitoring offset value in the first group of configuration parameters, and a parameter other than a monitoring cycle and a monitoring offset value in the second group of configuration parameters; and sending indication information to the terminal, where the indication information is used to indicate the monitoring cycle and the monitoring offset value in the first group of configuration parameters, and the monitoring cycle and the monitoring offset value in the second group of configuration parameters.

According to an eleventh aspect, a communications apparatus is provided. The communications apparatus may be a terminal, a chip in the terminal, or a system on chip. The communications apparatus includes a processor and a memory. The memory stores instructions. When the instructions are executed by the processor, the communications apparatus is enabled to perform the following steps: determining M candidate monitoring occasions of a search space, where M is a positive integer; determining N target monitoring occasions from the M candidate monitoring occasions based on a time domain location of on duration of a DRX cycle, where N is a positive integer less than or equal to M; and monitoring a power saving signal on the N target monitoring occasions in the search space, where the power saving signal is used to indicate power saving information of the terminal.

According to a twelfth aspect, a communications apparatus is provided. The communications apparatus may be a network device, a chip in the network device, or a system on chip. The communications apparatus includes a processor and a memory. The memory stores instructions. When the instructions are executed by the processor, the communications apparatus is enabled to perform the following steps: determining M candidate monitoring occasions of a search space, where M is a positive integer; determining N target monitoring occasions from the M candidate monitoring occasions based on a time domain location of on duration of a DRX cycle used by a terminal, where N is a positive integer less than or equal to M; and sending a power saving signal on the N target monitoring occasions in the search space, where the power saving signal is used to indicate power saving information of the terminal.

According to a thirteenth aspect, a communications apparatus is provided. The communications apparatus may be disposed on a terminal, or may be a part of the terminal, or the terminal. The communications apparatus may include an apparatus, a unit, or a module configured to perform the method steps in the first aspect or the various designs of the first aspect. For example, the communications apparatus may include a first processing unit and a second processing unit. The first processing module is configured to: when the terminal uses a long DRX cycle, monitor a power saving signal in a first search space, and skip monitoring the power saving signal in a second search space, where the power saving signal is used to indicate power saving information of the terminal. The second processing module is configured to: when the terminal uses a short DRX cycle, monitor the power saving signal in the second search space, and skip monitoring the power saving signal in the first search space.

According to a fourteenth aspect, a communications apparatus is provided. The communications apparatus may be disposed on a network device, or may be a part of the network device, or the network device. The communications apparatus may include an apparatus, a unit, or a module configured to perform the method steps in the second aspect or the various designs of the second aspect. For example, the communications apparatus may include a first communications module and a second communications module. The first communications module is configured to: when a terminal uses a long DRX cycle, send a power saving signal in a first search space, and skip sending the power saving signal in a second search space, where the power saving signal is used to indicate power saving information of the terminal. The second communications module is configured to: when the terminal uses a short DRX cycle, send the power saving signal in the second search space, and skip sending the power saving signal in the first search space.

According to a fifteenth aspect, a communications apparatus is provided. The communications apparatus may be disposed on a terminal, or may be a part of the terminal, or the terminal. The communications apparatus may include an apparatus, a unit, or a module configured to perform the method steps in the third aspect or the various designs of the third aspect. For example, the communications apparatus may include a first processing module and a second processing module. The first processing module is configured to: when the terminal uses a long DRX cycle, monitor a power saving signal in a search space based on a first group of configuration parameters of the search space, where the power saving signal is used to indicate power saving information of the terminal. The second processing module is configured to: when the terminal uses a short DRX cycle, monitor the power saving signal in the search space based on a second group of configuration parameters of the search space.

In a possible design, the communications apparatus further includes a communications module. The communications module is configured to receive configuration information of the search space, where the configuration information of the search space is used to indicate the first group of configuration parameters and the second group of configuration parameters.

In a possible design, the communications apparatus further includes a communications module. The communications module is configured to: receive configuration information of the search space, and receive indication information. The configuration information of the search space is used to indicate a parameter other than a monitoring cycle and a monitoring offset value in the first group of configuration parameters, and a parameter other than a monitoring cycle and a monitoring offset value in the second group of configuration parameters. The indication information is used to indicate the monitoring cycle and the monitoring offset value in the first group of configuration parameters, and the monitoring cycle and the monitoring offset value in the second group of configuration parameters.

According to a sixteenth aspect, a communications apparatus is provided. The communications apparatus may be disposed on a network device, or may be a part of the network device, or the network device. The communications apparatus may include an apparatus, a unit, or a module configured to perform the method steps in the fourth aspect or the various designs of the fourth aspect. For example, the communications apparatus may include a first communications module and a second communications module. The first communications module is configured to: when a terminal uses a long DRX cycle, send a power saving signal in a search space based on a first group of configuration parameters of the search space, where the power saving signal is used to indicate power saving information of the terminal. The second communications module is configured to: when the terminal uses a short DRX cycle, send the power saving signal in the search space based on a second group of configuration parameters of the search space.

In a possible design, the first communications module/the second communications module is further configured to send configuration information of the search space to the terminal, where the configuration information of the search space is used to indicate the first group of configuration parameters and the second group of configuration parameters.

In a possible design, the first communications module/the second communications module is further configured to send configuration information of the search space to the terminal, and send indication information to the terminal. The configuration information of the search space is used to indicate a parameter other than a monitoring cycle and a monitoring offset value in the first group of configuration parameters, and a parameter other than a monitoring cycle and a monitoring offset value in the second group of configuration parameters. The indication information is used to indicate the monitoring cycle and the monitoring offset value in the first group of configuration parameters, and the monitoring cycle and the monitoring offset value in the second group of configuration parameters.

According to a seventeenth aspect, a communications apparatus is provided. The communications apparatus may be disposed on a terminal, or may be a part of the terminal, or the terminal. The communications apparatus may include an apparatus, a unit, or a module configured to perform the method steps in the fifth aspect or the various designs of the fifth aspect. For example, the communications apparatus may include a first processing module and a second processing module. The first processing module is configured to: determine M candidate monitoring occasions of a search space, where M is a positive integer; and determine N target monitoring occasions from the M candidate monitoring occasions based on a time domain location of on duration of a DRX cycle, where N is a positive integer less than or equal to M. The second processing module is configured to monitor a power saving signal on the N target monitoring occasions in the search space, where the power saving signal is used to indicate power saving information of the terminal.

According to an eighteenth aspect, a communications apparatus is provided. The communications apparatus may be disposed on a network device, or may be a part of the network device, or the network device. The communications apparatus may include an apparatus, a unit, or a module configured to perform the method steps in the sixth aspect or the various designs of the sixth aspect. For example, the communications apparatus may include a processing module and a communications module. The processing module is configured to: determine M candidate monitoring occasions of a search space, where M is a positive integer; and determine N target monitoring occasions from the M candidate monitoring occasions based on a time domain location of on duration of a DRX cycle used by a terminal, where N is a positive integer less than or equal to M. The communications module is configured to send a power saving signal on the N target monitoring occasions in the search space, where the power saving signal is used to indicate power saving information of the terminal.

According to a nineteenth aspect, a computer-readable storage medium is provided. The computer-readable storage medium stores instructions. When the instructions are run on a computer, the computer is enabled to perform the method in any design of the first aspect to the sixth aspect.

According to a twentieth aspect, a computer program product including instructions is provided. When the computer program product is run on a computer, the computer is enabled to perform the method in any design of the first aspect to the sixth aspect.

According to a twenty-first aspect, a chip is provided. The chip includes a processor, and when the processor executes instructions, the processor is configured to perform the method in any design of the first aspect to the sixth aspect. The instructions may be from a memory inside the chip, or may be from a memory outside the chip. Optionally, the chip further includes an input/output circuit.

For technical effects brought by any design of the seventh aspect to the sixteenth aspect, refer to technical effects brought by the foregoing corresponding methods. Details are not described herein again.

According to a twenty-second aspect, a communications system is provided, including a network device and a terminal. The terminal is configured to perform the search space monitoring method in any design of the first aspect, the third aspect, or the fifth aspect. The network device is configured to perform the communications method in any design of the second aspect, the fourth aspect, or the sixth aspect.

DESCRIPTION OF EMBODIMENTS

Figure 1:
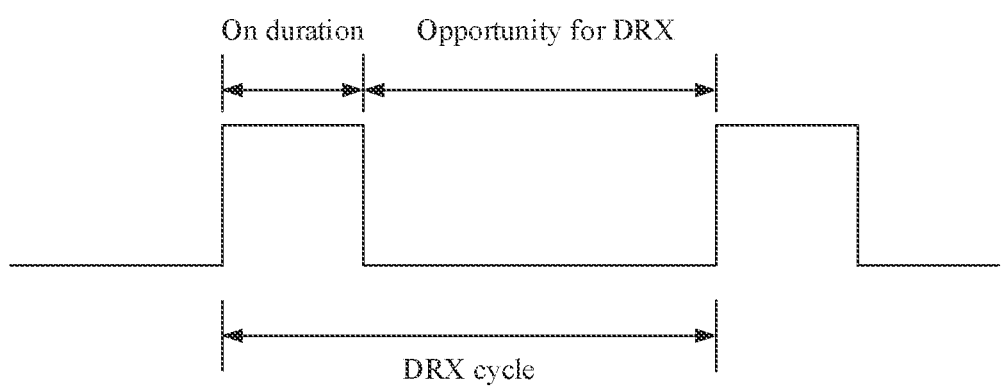
FIG. 1 is a schematic diagram of a DRX cycle.

In the descriptions of this application, unless otherwise specified, "/" means "or". For example, A/B may represent A or B. In this specification, "and/or" describes an association relationship for describing associated objects and represents that there may be three relationships. For example, A and/or B may represent the following three cases: Only A exists, both A and B exist, and only B exists. In addition. "at least one" means one or more, and "a plurality of" means two or more. Terms such as "first" and "second" do not limit a quantity and an execution sequence, and the terms such as "first" and "second" do not indicate a definite difference.

It should be noted that, in this application, the term such as "example" or "for example" is used to represent giving an example, an illustration, or descriptions. Any embodiment or design described as an "example" or "for example" in this application should not be explained as being more preferred or having more advantages than another embodiment or design. Exactly, use of the term such as "example" or "for example" is intended to present a related concept in a specific manner.

To facilitate understanding of the technical solutions of this application, the following first briefly describes terms used in this application.

1. PDCCH

The PDCCH is used to carry scheduling information and other control information, for example, downlink control information (downlink control information, DCI). The PDCCH includes a control channel element (control channel element, CCE).

2. DCI

The DCI may include content such as resource block (resource block, RB) allocation information and a modulation and coding scheme (modulation and coding scheme, MCS). Different DCI carries different information and has different functions. To classify the DCI, a plurality of DCI formats (format) are defined in a protocol.

For example, a current communications standard defines the following DCI formats:

a DCI format 0-0: used to schedule uplink data of a terminal;

a DCI format 1-0: used to schedule downlink data of a terminal;

a DCI format 2-0: used to indicate a slot format; and a DCI format 2-1: used to indicate interrupted transmission (interrupted transmission).

The foregoing DCI formats are merely examples, and are not described herein one by one.

3. Power Saving Signal (Power Saving Signal)

The power saving signal is used to indicate power saving information. The power saving signal may be used to implement power saving.

Optionally, the power saving signal is before on duration of a DRX cycle, and is used to indicate that a terminal is in a sleep state or a normal working state in the on duration of the DRX cycle associated with the power saving signal. Optionally, bit information may be used in the power saving signal to indicate that a terminal is in a sleep state or a normal working state in on duration of a DRX cycle associated with the power saving signal. For example, one bit is used in the power saving signal for indication. When the bit is '0', it indicates that the terminal is in a sleep state; or when the bit is '1', it indicates that the terminal is in a normal working state. In addition, the power saving signal may be further used to indicate another function, for example, indicate the terminal to skip PDCCH monitoring (skipping PDCCH monitoring), indicate the terminal to switch between bandwidth parts (bandwidth part, BWP), indicate secondary cell activation or deactivation, or trigger channel state measurement.

Optionally, the power saving signal may be implemented based on a PDCCH or DCI. It should be noted that, when the power saving signal is implemented based on the DCI, the power saving signal may be represented by using a specific DCI format. For example, in the embodiments of this application, the power saving signal may be represented by using a DCI format M. The power saving signal implemented based on the PDCCH has advantages of high reliability and low probability of missing or false detection.

The following describes the power saving signal by using an example with reference to an actual application scenario. For example, a user uses a mobile phone to watch a video online. When the mobile phone needs to buffer the video data, the mobile phone needs to monitor scheduling information sent by a base station, determine, based on the scheduling information sent by the base station, a time-frequency resource location at which the "video data" is received, and obtain the video data at the corresponding time-frequency resource location. When the mobile phone has finished buffering the video data, the mobile phone does not need to monitor the scheduling information sent by the base station. In this application, when the base station finds that there is no data that needs to be sent to the mobile phone, that is, when the mobile phone has finished buffering the video data and does not need to monitor the scheduling information, the base station may send the power saving signal to the mobile phone, to indicate the mobile phone not to monitor the scheduling information in on duration of a next DRX cycle, thereby reducing power consumption of the mobile phone. On the contrary, if the base station finds that there is data that needs to be sent to a target user, the base station may indicate the mobile phone to monitor the scheduling information in on duration of a corresponding DRX cycle by using the power saving signal.

4. Search Space

The search space is a set of candidate PDCCHs. The search space may include a common search space (common search space) and a UE-specific search space (UE-specific search space). The common search space is used to transmit related control information such as a paging (Paging) message and system information. The UE-specific search space is used for control information related to a downlink shared channel (downlink shared channel. DL-SCH), an uplink shared channel (uplink shared channel. UL-SCH), and the like. Certainly, the common search space may be also used to transmit control information belonging to specific UE. This is not limited in the embodiments of this application.

It may be understood that a network device may configure one or more search spaces for a terminal, or a network device may delete a search space previously configured for a terminal. For example, the following shows corresponding signaling configured by the network device for the terminal in a current protocol.

```
PDCCH-Config ::=            SEQUENCE {
    ...
    searchSpacesToAddModList    SEQUENCE(SIZE (1..10)) OF SearchSpace
                                                            OPTIONAL,
-- Need N
    searchSpacesToReleaseList   SEQUENCE(SIZE (1..10)) OF SearchSpaceId
                                                            OPTIONAL,
--Need N
    ...
}
```

Herein, searchSpacesToAddModList indicates a list of newly added search spaces. SEQUENCE is used to indicate that the variable searchSpacesToAddModList is of an array type (or referred to as a list type). SIZE (1 ... 10) means that the array (or list) includes 1 to 10 elements. OF SearchSpace means that each element in the array (or list) is a variable of a type SearchSpace.

Herein, searchSpacesToReleaseList indicates a list of to-be-deleted search spaces. SEQUENCE is used to indicate that the variable searchSpacesToReleaseList is of an array type (or referred to as a list type). SIZE (1 ... 10) means that the array (or list) includes 1 to 10 elements. OF SearchSpaceId means that each element in the array (or list) is a variable of a type SearchSpaceId.

OPTIONAL is used to indicate that a parameter is optional (optional) but not mandatory (mandatory).

Need N is used to indicate that, once a parameter (for example, searchSpacesToAddModList or searchSpacesToReleaseList) does not exist in a reconfiguration message, a previously configured value of the parameter is erased, which means that the parameter has not been configured.

For specific descriptions of the foregoing signaling, refer to the conventional technology. Details are not described herein.

5. Configuration Parameter of a Search Space

Optionally, the configuration parameter of the search space may be an aggregation level, a quantity of candidate PDCCHs corresponding to the aggregation level, a monitoring cycle, a monitoring offset value, a time domain length, a to-be-monitored symbol in a slot, or a type of the search space.

For example, in a protocol, a SearchSpace information element (information element, IE) may be used to configure a configuration parameter of a search space. The SearchSpace IE may be as follows: For specific content of the information element, refer to related descriptions in the 3rd generation partnership project (3rd generation partnership project, 3GPP) technical specification (technical specification, TS) 38.331.

```
SearchSpace ::=                                  SEQUENCE {
  ...
  monitoringSlotPeriodicityAndOffset             CHOICE {
    sl1              NULL,
    sl2              INTEGER (0..1),
    sl4              INTEGER (0..3),
    sl5              INTEGER (0..4),
    sl8              INTEGER (0..7),
    sl10             INTEGER (0..9),
    sl16             INTEGER (0..15),
    sl20             INTEGER (0..19),
    sl40             INTEGER (0..39),
    sl80             INTEGER (0..79),
    sl160            INTEGER (0..159),
    sl320            INTEGER (0..319),
    Sl640            INTEGER (0..639),
    sl1280           INTEGER (0..1279),
    sl2560           INTEGER (0..2559)
  }                                              OPTIONAL, -- Cond Setup
  duration           INTEGER (2..2559)           OPTIONAL, -- Need R
  monitoringSymbolsWithinSlot    BIT STRING (SIZE (14)) OPTIONAL,  -- Cond Setup
  nrofCandidates                                 SEQUENCE {
    aggregationLevel1        ENUMERATED {n0, n1, n2, n3, n4, n5, n6, n8},
    aggregationLevel2        ENUMERATED {n0, n1, n2, n3, n4, n5, n6, n8},
    aggregationLevel4        ENUMERATED {n0, n1, n2, n3, n4, n5, n6, n8},
    aggregationLevel8        ENUMERATED {n0, n1, n2, n3, n4, n5, n6, n8},
    aggregationLevel16       ENUMERATED {n0, n1, n2, n3, n4, n5, n6, n8}
  }                                              OPTIONAL, -- Cond Setup
  searchSpaceType           CHOICE {
    common                  SEQUENCE {
      dci-Format0-0-AndFormat1-0         SEQUENCE {
        ...
      }                                          OPTIONAL, -- Need R
      dci-Format2-0                      SEQUENCE {
        nrofCandidates-SFI               SEQUENCE {
          aggregationLevel1      ENUMERATED {n1, n2} OPTIONAL,-- Need R
          aggregationLevel2      ENUMERATED {n1, n2} OPTIONAL,-- Need R
          aggregationLevel4      ENUMERATED {n1, n2} OPTIONAL,-- Need R
          aggregationLevel8      ENUMERATED {n1, n2} OPTIONAL,-- Need R
          aggregationLevel16     ENUMERATED {n1, n2} OPTIONAL -- Need R
        },
        ...
      }                                          OPTIONAL,-- Need R
      dci-Format2-1       SEQUENCE {
        ...
      }                                          OPTIONAL,-- Need R
      dci-Format2-2       SEQUENCE {
        ...
      }                                          OPTIONAL,-- Need R
      dci-Format2-3       SEQUENCE {
        monitoringPeriodicity ENUMERATED {n1, n2, n4, n5, n8, n10, n16, n20 }
                        OPTIONAL,        -- Cond Setup
        nrofPDCCH-Candidates        ENUMERATED {n1, n2},
        ...
      }                                          OPTIONAL -- Need R
    },
    ue-Specific             SEQUENCE {
      dci-Formats           ENUMERATED {formats0-0-And-1-0, formats0-1-And-1-1},
      ...
    }
  }
}
```

The following briefly describes each configuration parameter of the search space with reference to the foregoing information element.

(1) monitoringSlotPeriodicityAndOffset is used to indicate a monitoring cycle and a monitoring offset value of the search space.

In the embodiments of this application, one monitoring cycle may include at least one slot. In the foregoing information element, a network device may select a parameter from sl1, sl2 . . . , and sl12560 to configure the monitoring cycle. Herein, sl1 indicates that one monitoring cycle includes one slot, and sl2 indicates that one monitoring cycle includes two slots. By analogy, sl12560 indicates that one monitoring cycle includes 12560 slots.

INTEGER is used to indicate a monitoring offset value. The monitoring offset value is used to determine a start slot in which a terminal performs monitoring in the monitoring cycle. Specifically, the monitoring offset value is used to determine a slot, in the monitoring cycle, in which the terminal starts to monitor the search space. For example, if the monitoring cycle includes four slots, and the monitoring offset value is 2, it indicates that the terminal starts to monitor the search space in a third slot in the monitoring cycle. It should be noted that the monitoring offset value cannot be greater than a length of the monitoring cycle (that is, a quantity of slots included in the monitoring cycle). For example, the monitoring cycle is sl2, and INTEGER (0 . . . 1) is used to indicate that a value range of the monitoring offset value is {0, 1}. The monitoring cycle is sl4, and INTEGER (0 . . . 3) is used to indicate that a value range of the monitoring offset value is {0, 1, 2, 3}.

(2) duration is used to indicate a time domain length of the search space. The time domain length of the search space is a quantity of slots that last each time the search space appears, that is, a quantity of slots in which a terminal needs to perform monitoring. For example, if the time domain length of the search space is three slots, the terminal needs to monitor the search space in three consecutive slots.

(3) monitoringSymbolsWithinSlot is used to indicate a to-be-monitored start symbol in one slot. It should be noted that the symbol is an orthogonal frequency division multiplexing (orthogonal frequency division multiplexing, OFDM) symbol.

In specific implementation, monitoringSymbolsWithinSlot is a sequence with a length of 14 bits. Each bit in the sequence of 14 bits is in a one-to-one correspondence with each OFDM symbol in the slot. A value of each bit in the sequence of 14 bits is used to indicate whether an OFDM symbol corresponding to the bit is a start symbol. Specifically, when a value of one bit in the sequence of 14 bits is 1, it indicates that an OFDM symbol corresponding to the bit is a start symbol. When a value of one bit in the sequence of 14 bits is 0, it indicates that an OFDM symbol corresponding to the bit is not a start symbol. For example, if the sequence of 14 bits is 10000000100000, a symbol #0 and a symbol #7 in the slot are start symbols.

It should be noted that, if a cyclic prefix (cyclic prefix, CP) of a symbol is set to an extended (extended) cyclic prefix in a bandwidth part (bandwidth part, BWP) configured by a network device for a terminal, the last two bits of monitoringSymbolsWithinSlot may be ignored.

It should be noted that the start symbol is the first symbol in a plurality of consecutive to-be-monitored symbols in one slot. One slot may include a plurality of start symbols. The terminal may determine, based on a start symbol configured in monitoringSymbolsWithinSlot and a specific quantity of consecutive to-be-monitored symbols configured in a control resource set (ControlResourceSet, CORESET), symbols that are to be monitored symbols in one slot. For example, if monitoringSymbolsWithinSlot is 10000000100000, and the specific quantity of consecutive to-be-monitored symbols configured in the control resource set is 3, a symbol #0, a symbol #1, a symbol #2, a symbol #7, a symbol #8, and a symbol #9 in the slot are to-be-monitored symbols.

(4) nrofCandidates is used to configure a quantity of candidate PDCCHs corresponding to each of a plurality of aggregation levels of the search space.

The aggregation level is a quantity of CCEs included in one PDCCH. A plurality of aggregation levels are defined in a protocol, for example, 1, 2, 4, 8, and 16. For example, if the aggregation level of the search space is 16, it indicates that the PDCCH carried in the search space includes 16 CCEs.

It should be noted that, unless otherwise specified, the quantity of candidate PDCCHs corresponding to each aggregation level of the search space that is configured by using nrofCandidates is applicable to any DCI format.

(5) searchSpaceType is used to indicate a type of the search space, that is, used to indicate whether the search space is a common search space or a UE-specific search space.

When searchSpaceType is set to common, it indicates that the search space is a common search space. In this case, searchSpaceType may further include any one or more of the following parameters: dci-Format0-0-AndFormat1-0, dci-Format2-0, dci-Format2-1, dci-Format2-2, and dci-Format2-3. When any one of the foregoing parameters is selected, it indicates that a terminal needs to monitor, in the search space, a DCI format corresponding to the parameter. When one of the foregoing parameters is not selected, it indicates that the terminal does not need to monitor, in the search space, a DCI format corresponding to the parameter. For example, when searchSpaceType includes dci-Format0-0-AndFormat1-0, and does not include the other parameters, it indicates that the terminal needs to monitor a DCI format 0-0 and a DCI format 1-0, and does not need to monitor a DCI format 2-0, a DCI format 2-1, a DCI format 2-2, and a DCI format 2-3 in the search space.

When searchSpaceType is set to UE-specific, it indicates that the search space is a UE-specific search space. In this case, searchSpaceType may further include any one or more of the following parameters: formats0-0-And-1-0 and formats0-1-And-1-1. When any one of the foregoing parameters is selected, it indicates that the terminal needs to monitor, in the search space, a DCI format corresponding to the parameter. When one of the foregoing parameters is not selected, it indicates that the terminal does not need to monitor, in the search space, a DCI format corresponding to the parameter. If formats0-0-And-1-0 is configured in searchSpaceType but formats0-1-And-1-1 is not configured, the terminal needs to monitor a DCI format 0-0 and a DCI format 1-0, and does not need to monitor a DCI format 0-1 and a DCI format 1-1 in the search space.

6. DRX

A DRX mechanism includes two modes: idle (IDLE) DRX and connected (connected) DRX. The two types of DRX are implemented differently. The embodiments of this application mainly describe the connected DRX (C-DRX).

The DRX mechanism configures one DRX cycle (cycle) for a terminal in RRC connected mode. As shown in FIG. 1, the DRX cycle includes "on duration" and "opportunity for DRX". Within a time of "on duration", the terminal monitors and receives a downlink control channel (for example, a PDCCH). Within a time of "opportunity for DRX", the terminal does not receive data from a downlink channel for power saving.

The DRX cycle may be classified into a long DRX cycle and a short DRX cycle. Generally, the long DRX cycle is an integer multiple of the short DRX cycle. It should be noted that the long DRX cycle is mandatory by default, and the short DRX cycle is optional. To be specific, when the DRX mechanism is used, a network device needs to configure a long DRX cycle for a terminal, and the network device may or may not configure a short DRX cycle for the terminal. Signaling used to configure a long DRX cycle or a short DRX cycle may be RRC signaling.

Optionally, RRC signaling used to configure a long DRX cycle includes at least the following parameters: a time length of the long DRX cycle, a time length of on duration, and the like.

Optionally, RRC signaling used to configure a short DRX cycle includes at least the following parameters: a time length of the short DRX cycle, a time length of drx-ShortCycleTimer, and the like.

If the network device configures a short DRX cycle for the terminal, the terminal starts a timer drx-ShortCycleTimer when using the short DRX cycle. When the timer drx-ShortCycleTimer expires, the terminal switches from using the short DRX cycle to using a long DRX cycle. A timing length of the timer drx-ShortCycleTimer is generally an integer multiple of the short DRX cycle.

In addition, the network device may send media access control (media access control, MAC) control element (control element, CE) signaling to the terminal, to indicate the terminal to switch between a long DRX cycle and a short DRX cycle.

In the embodiments of this application, that the terminal uses a long DRX cycle may be understood as: The terminal is using the long DRX cycle, or the terminal switches to a mode of the long DRX cycle. It may be understood that when the terminal switches to a mode of the long DRX cycle, a first long DRX cycle may not actually start.

In the embodiments of this application, that the terminal uses a short DRX cycle may be understood as: The terminal is using the short DRX cycle, or the terminal switches to the short DRX cycle. It may be understood that when the terminal switches to a mode of the short DRX cycle, a first short DRX cycle may not actually start.

7. DRX cycle associated with a power saving signal, and power saving signal associated with a DRX cycle The DRX cycle associated with the power saving signal is a DRX cycle of terminal behavior indicated by the power saving signal.

The power saving signal associated with the DRX cycle is a power saving signal indicating terminal behavior in the DRX cycle.

Generally, the power saving signal is sent in several slots or several milliseconds before the DRX cycle associated with the power saving signal. For example, if a terminal receives a power saving signal #1 in N slots or M milliseconds before a DRX cycle #1, a DRX cycle associated with the power saving signal #1 is a DRX cycle #1, and a power saving signal associated with the DRX cycle #1 is the power saving signal #1.

The terminal behavior may be: whether the terminal detects a PDCCH, whether the terminal switches between BWPs, whether the terminal performs channel state measurement and reporting, and the like.

The following describes use of a long DRX cycle and a short DRX cycle in an actual application scenario by using an example. For example, when a user uses a mobile phone to watch a video, the mobile phone may use a short DRX cycle, and a length of the short DRX cycle may be 40 ms, that is, the mobile phone monitors, every 40 ms (that is, on duration of the short DRX cycle), scheduling information sent by a base station. After receiving the scheduling information, the mobile phone determines, based on the scheduling information sent by the base station, a time-frequency resource location at which the video data is received, and obtains the video data at the corresponding time-frequency resource location. If the mobile phone has finished buffering the video data and does not need to receive the video data temporarily, the mobile phone does not receive, within a period of time (for example, several short DRX cycles), scheduling information sent by the base station. Once a time in which the mobile phone does not receive scheduling information exceeds a preset threshold, the mobile phone may switch from using the short DRX cycle to using a long DRX cycle. A length of the long DRX cycle used by the mobile phone may be 160 ms. In this way, the mobile phone monitors, every 160 ms, scheduling information sent by the base station. Compared with the short DRX cycle used by the mobile phone, the long DRX cycle used by the mobile phone may increase a sleep time of the mobile phone, thereby helping reduce power consumption of the mobile phone.

The foregoing briefly describes the terms in the embodiments of this application. Details are not described below again.

Currently, a monitoring cycle of a search space is fixed. Therefore, if a network device configures only one search space used to carry a power saving signal for a terminal, the search space cannot be applied to both a long DRX cycle and a short DRX cycle. For example, it is assumed that the monitoring cycle of the search space is the same as the long DRX cycle. Generally, the long DRX cycle is an integer multiple of the short DRX cycle. Therefore, the monitoring cycle of the search space is an integer multiple of the short DRX cycle. Therefore, when the terminal uses the short DRX cycle, a monitoring occasion of the search space may not exist in the short DRX cycle, and consequently the terminal misses detecting a power saving signal in the short DRX cycle.

Figure 2:
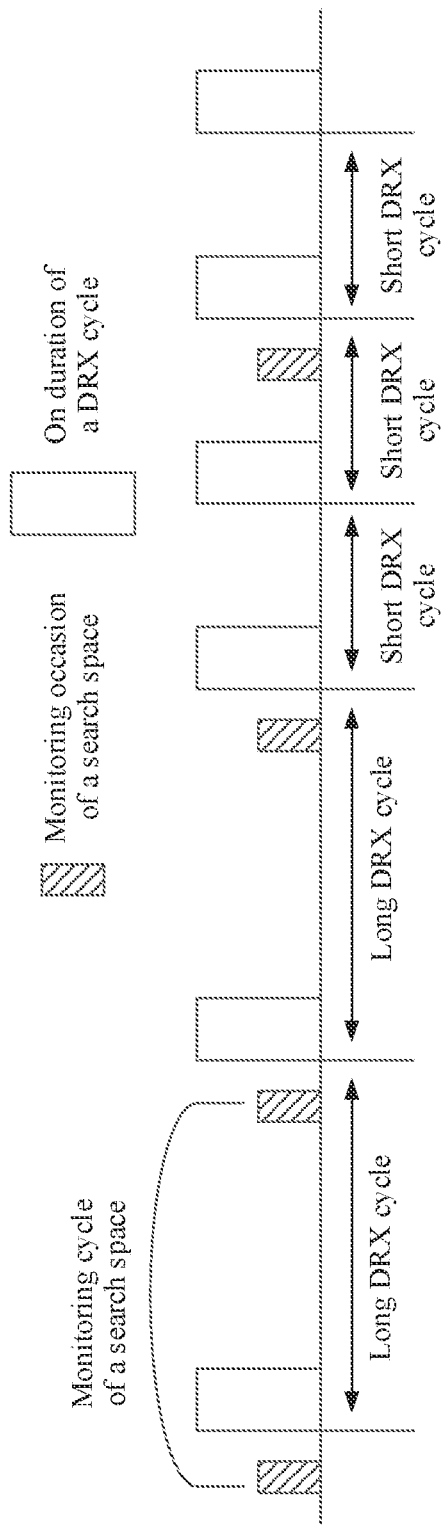
FIG. 2 is a schematic diagram of a DRX cycle and a monitoring occasion of a search space.

As shown in FIG. 2, the monitoring cycle of the search space is the same as the long DRX cycle, and a cycle length of the long DRX cycle is twice a cycle length of the short DRX cycle. It can be learned that, in this case, when the terminal switches from using the long DRX cycle to using the short DRX cycle, a monitoring occasion does not exist in the search space in a first short DRX cycle. Consequently, the terminal cannot normally monitor a power saving signal in the short DRX cycle.

Alternatively, the network device configures two search spaces used to carry a power saving signal for the terminal, where a monitoring cycle of one search space matches a long DRX cycle, and a monitoring cycle of the other search space matches a short DRX cycle. However, according to the conventional technology, once a network side configures two search spaces for a terminal, the terminal monitors the two search spaces regardless of whether the terminal uses a long DRX cycle or a short DRX cycle. However, the power saving signal is used to indicate that the terminal is in a sleep state or a normal working state in on duration of a DRX cycle associated with the power saving signal, and the power saving signal needs to be transmitted only in a search space corresponding to a DRX cycle currently used by the terminal. For example, the cycle length of the long DRX cycle is twice the cycle length of the short DRX cycle in FIG. 2. When the terminal uses the long DRX cycle, before on duration of the long DRX cycle, in addition to monitoring a search space corresponding to the long DRX cycle once, the terminal further needs to monitor a search space corresponding to the short DRX cycle twice. However, the power saving signal needs to be transmitted only in the search space corresponding to the long DRX cycle, and consequently the terminal cannot receive the power saving signal even if the terminal monitors the search space corresponding to the short DRX cycle. Similarly, when the terminal uses the short DRX cycle, before on duration of the short DRX cycle, in addition to monitoring a search space corresponding to the short DRX cycle, the terminal further needs to monitor a search space corresponding to the long DRX cycle. However, the power saving signal needs to be transmitted only in the search space corresponding to the short DRX cycle, and consequently the terminal cannot receive the power saving signal even if the terminal monitors the search space corresponding to the long DRX cycle. Consequently, power consumption of the terminal is increased.

To resolve the foregoing technical problem, the embodiments of this application provide the following technical solutions. For specific content, refer to the following content.

The technical solutions provided in the embodiments of this application may be applied to various communications systems, for example, a new radio (new radio, NR) communications system using a fifth generation (5th generation, 5G) communications technology, a future evolved system, or a plurality of convergent communications systems. The technical solutions provided in this application may be applied to a plurality of application scenarios, for example, machine to machine (machine to machine, M2M), macro-micro communication, enhanced mobile broadband (enhanced mobile broadband, eMBB), ultra-reliable low-latency communication (ultra reliable & low latency communication, uRLLC), and massive machine-type communications (massive machine type communication, mMTC). These scenarios may include but are not limited to a scenario of communication between communications devices, a scenario of communication between network devices, a scenario of communication between a network device and a communications device, and the like. The following provides descriptions by using an example in which the technical solutions are applied to a scenario of communication between a network device and a terminal.

In addition, a network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that, with evolution of the network architecture and emergence of a new service scenario, the technical solutions provided in the embodiments of this application are also applicable to similar technical problems.

Figure 3:
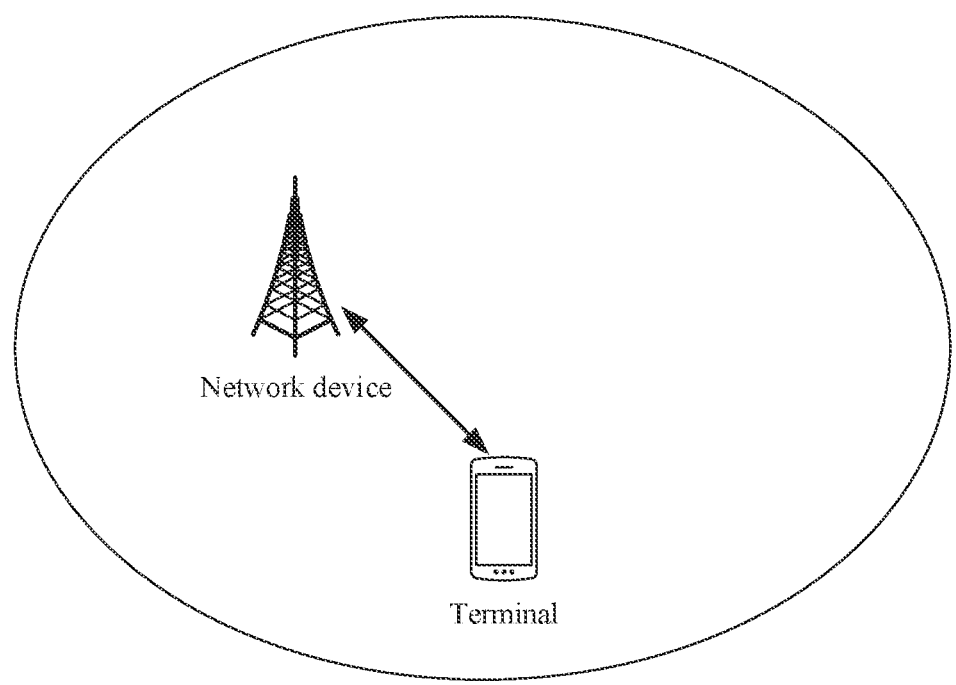
FIG. 3 is a schematic diagram of an architecture of a communications system according to an embodiment of this application.

FIG. 3 is a schematic diagram of an architecture of a communications system to which the technical solutions provided in this application are applicable. The communications system may include one or more network devices (FIG. 3 shows only one network device) and one or more terminals (FIG. 3 shows only one terminal).

The network device may be a base station, a base station controller, or the like in wireless communication. The base station may include various types of base stations, such as a micro base station (also referred to as a small cell), a macro base station, a relay node, and an access point. This is not specifically limited in the embodiments of this application. In the embodiments of this application, the base station may be a base transceiver station (base transceiver station, BTS) in a global system for mobile communications (global system for mobile communications, GSM) or code division multiple access (code division multiple access, CDMA), a NodeB (NodeB) in wideband code division multiple access (wideband code division multiple access, WCDMA), an evolved NodeB (evolved NodeB, eNB or e-NodeB) in long term evolution (long term evolution, LTE), an eNB in the internet of things (internet of things, IoT) or the narrowband internet of things (narrowband internet of things, NB-IoT), or a base station in a future 5G mobile communications network or a future evolved public land mobile network (public land mobile network, PLMN). This is not limited in the embodiments of this application. In the embodiments of this application, an apparatus configured to implement a function of the network device may be a network device, or may be an apparatus that can support the network device in implementing the function, for example, a chip system. In the embodiments of this application, an example in which an apparatus configured to implement a function of the network device is a network device is used to describe the technical solutions provided in the embodiments of this application.

A network device described in this application, for example, a base station, usually includes a baseband unit (baseband unit, BBU), a remote radio unit (remote radio unit, RRU), an antenna, and a feeder used to connect the RRU and the antenna. The BBU is configured to be responsible for signal modulation. The RRU is configured to be responsible for radio frequency processing. The antenna is configured to be responsible for conversion between a pilot wave on a cable and a space wave in the air. On one hand, a distributed base station greatly shortens a length of the feeder between the RRU and the antenna, thereby reducing a signal loss, and reducing costs of the feeder. On the other hand, the RRU and the antenna are relatively small and can be installed anywhere, making network planning more flexible. The RRU may be remotely placed. In addition to that, all BBUs may be centralized and placed in a central office (central office, CO). In this centralized manner, a quantity of base station equipment rooms can be greatly reduced, energy consumption of auxiliary devices, especially air conditioners, can be reduced, and carbon emissions can be greatly reduced. In addition, after distributed BBUs are integrated into a BBU baseband pool, the BBUs can be managed and scheduled centrally, and resources can be allocated more flexibly. In this mode, all physical base stations evolve into virtual base stations. All the virtual base stations share information such as data sent and received by users and channel quality in the BBU baseband pool, and cooperate with each other, to implement joint scheduling.

In some deployments, the base station may include a centralized unit (centralized unit, CU) and a distributed unit (Distributed Unit, DU). The base station may further include an active antenna unit (active antenna unit, AAU). The CU implements some functions of the base station, and the DU implements some functions of the base station. For example, the CU is responsible for processing a non-real-time protocol and service, and implements functions of a radio resource control (radio resource control, RRC) layer and a packet data convergence protocol (packet data convergence protocol, PDCP) layer. The DU is responsible for processing a physical layer protocol and a real-time service, and implements functions of a radio link control (radio link control, RLC) layer, a media access control (media access control, MAC) layer, and a physical (physical, PHY) layer. The AAU implements some physical layer processing functions, radio frequency processing, and a function related to an active antenna. Information at the RRC layer eventually becomes information at the PHY layer, or is converted from the information at the PHY layer. Therefore, in this architecture, higher layer signaling, for example, RRC layer signaling or PDCP layer signaling, may also be considered as being sent by the DU or sent by the DU and the AAU. It may be understood that the network device may be a device including one or more of a CU node, a DU node, and an AAU node. In addition, the CU may be classified as a network device in the RAN, or the CU may be classified as a network device in a core network (core network, CN). This is not limited herein.

The terminal is a device that has a wireless transceiver function. The terminal may be deployed on land, including an indoor device, an outdoor device, a handheld device, or a vehicle-mounted device, may be deployed on a water surface (such as on a ship), or may be deployed in the air (for example, on an aircraft, a balloon, or a satellite). The terminal device may be user equipment (user equipment, UE). The UE includes a handheld device, a vehicle, a vehicle-mounted device, a wearable device, or a computing device that has a wireless communication function. For example, the UE may be a mobile phone (mobile phone), a tablet computer, or a computer having a wireless transceiver function. Alternatively, the terminal device may be a virtual reality (virtual reality, VR) terminal device, an augmented reality (augmented reality, AR) terminal device, a wireless terminal in industrial control, a wireless terminal in self-driving, a wireless terminal in telemedicine, a wireless terminal in a smart grid, a wireless terminal in a smart city (smart city), a wireless terminal in a smart home (smart home), or the like. In the embodiments of this application, an apparatus configured to implement a function of the terminal may be a terminal, or may be an apparatus that can support the terminal in implementing the function, for example, a chip system. In the embodiments of this application, the chip system may include a chip, or may include a chip and another discrete component. In the embodiments of this application, an example in which an apparatus configured to implement a function of the terminal is a terminal is used to describe the technical solutions provided in the embodiments of this application.

Figure 4:
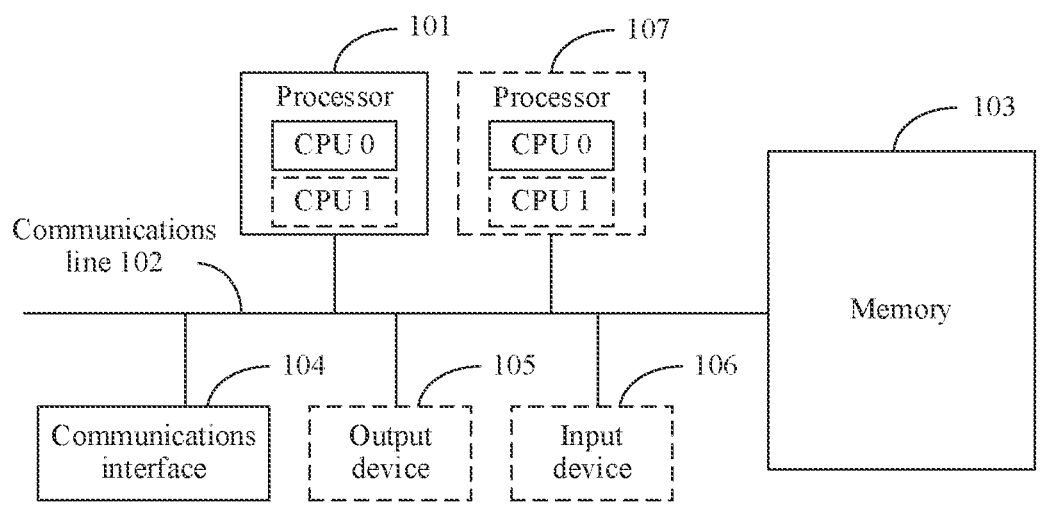
FIG. 4 is a schematic diagram of a structure of a communications apparatus according to an embodiment of this application.

As shown in FIG. 4, the communications apparatus includes at least one processor 101, a communications line 102, a memory 103, and at least one communications interface 104.

The processor 101 may be a general-purpose central processing unit (central processing unit, CPU), a microprocessor, an application-specific integrated circuit (application-specific integrated circuit, ASIC), or one or more integrated circuits configured to control program execution of the solutions of this application.

The communications line 102 may include a path for transferring information between the components described above.

The communications interface 104, which uses any apparatus such as a transceiver, is configured to communicate with another device or communications network, such as the Ethernet, a RAN, or a wireless local area network (wireless local area networks, WLAN).

The memory 103 may be a read-only memory (read-only memory. ROM) or another type of static storage device capable of storing static information and instructions, or a random access memory (random access memory. RAM) or another type of dynamic storage device capable of storing information and instructions. Alternatively, the memory 103 may be an electrically erasable programmable read-only memory (electrically erasable programmable read-only memory, EEPROM), a compact disc read-only memory (compact disc read-only memory, CD-ROM) or another optical disk storage, an optical disc storage (including a compact optical disc, a laser disc, an optical disc, a digital versatile disc, a Blu-ray disc, or the like), a magnetic disk storage medium or another magnetic storage device, or any other medium that can be configured to carry or store expected program code in a form of instructions or a data structure and that can be accessed by a computer. However, this is not limited herein. The memory may exist independently, and is connected to the processor through the communications line 102. The memory may alternatively be integrated with the processor. The memory provided in this embodiment of this application may usually be non-volatile. The memory 103 is configured to store computer-executable instructions for performing the solutions of this application, and the processor 101 controls execution of the computer-executable instructions. The processor 101 is configured to execute the computer-executable instructions stored in the memory 103, to implement the method provided in the embodiments of this application.

Optionally, the computer-executable instructions in the embodiments of this application may also be referred to as application program code. This is not specifically limited in the embodiments of this application.

In specific implementation, in an embodiment, the processor 101 may include one or more CPUs such as a CPU 0 and a CPU 1 in FIG. 4.

In specific implementation, in an embodiment, the communications apparatus may include a plurality of processors, for example, the processor 101 and a processor 107 in FIG. 4. Each of the processors may be a single-core (single-CPU) processor, or may be a multi-core (multi-CPU) processor. The processor herein may be one or more devices, circuits, and/or processing cores configured to process data (for example, computer program instructions).

In specific implementation, in an embodiment, the communications apparatus may further include an output device 105 and an input device 106. The output device 105 communicates with the processor 101, and may display information in a plurality of manners. For example, the output device 105 may be a liquid crystal display (liquid crystal display, LCD), a light emitting diode (light emitting diode, LED) display device, a cathode ray tube (cathode ray tube, CRT) display device, or a projector (projector). The input device 106 communicates with the processor 101, and may receive an input from a user in a plurality of manners. For example, the input device 106 may be a mouse, a keyboard, a touchscreen device, or a sensor device.

The following describes the technical solutions provided in the embodiments of this application in detail with reference to the accompanying drawings of this specification.

Figure 5:
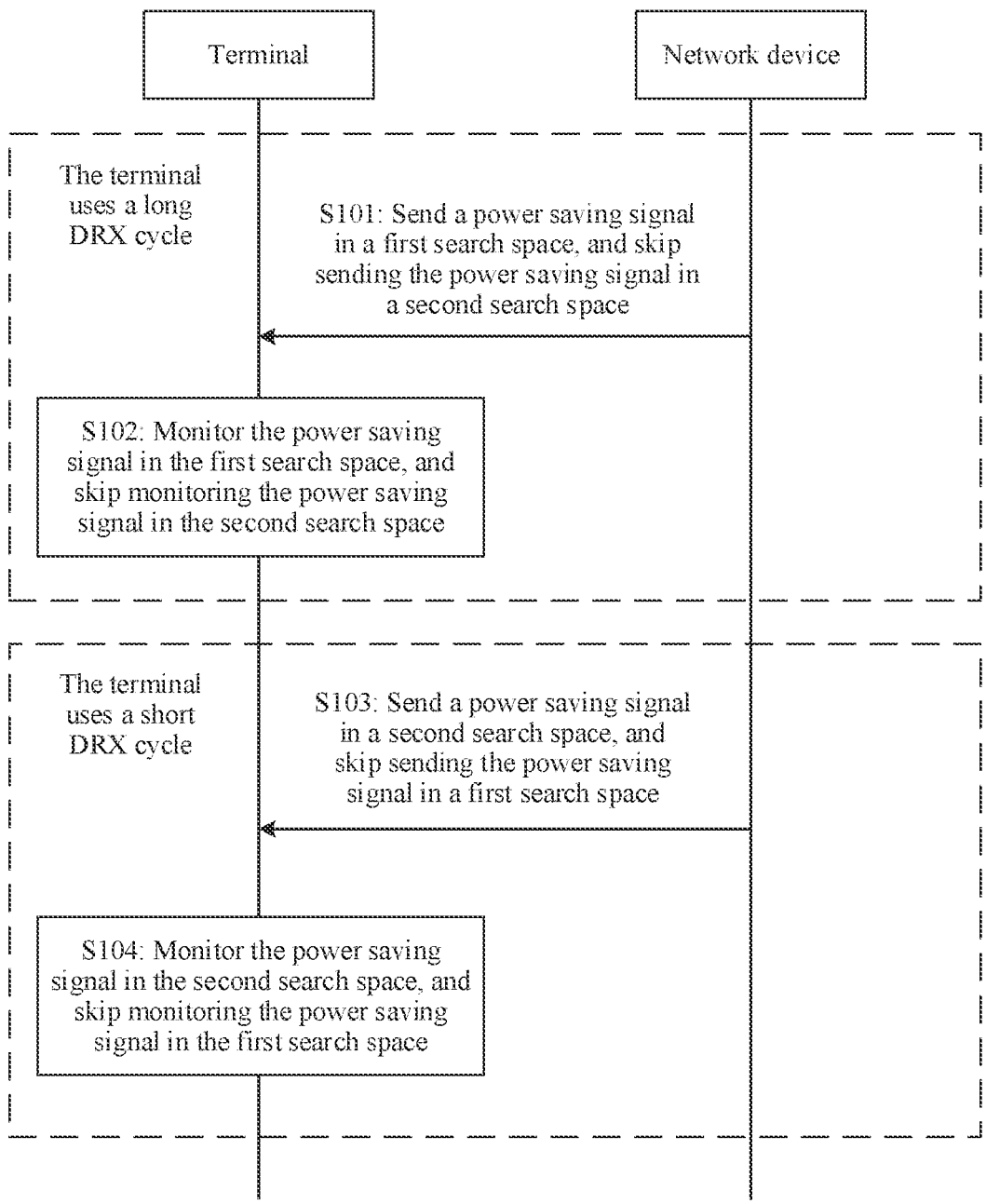
FIG. 5 is a flowchart of a search space monitoring method according to an embodiment of this application.

FIG. 5 shows a search space monitoring method according to an embodiment of this application. The method includes the following steps.

S101: When a terminal uses a long DRX cycle, a network device sends a power saving signal in a first search space, and does not send the power saving signal in a second search space.

Optionally, step S101 may be expressed as follows: The network device sends, in the first search space, the power saving signal associated with the long DRX cycle, and does not send, in the second search space, the power saving signal associated with the long DRX cycle.

The first search space and the second search space are two different search spaces. The first search space and the second search space are search spaces that are configured by the network device and that are used to carry the power saving signal. The first search space corresponds to a long DRX cycle, and the second search space corresponds to a short DRX cycle.

Optionally, the network device may explicitly enable the terminal to learn a search space used to carry the power saving signal. For example, the network device may send first information to the terminal, and the first information includes identifiers of one or more search spaces used to carry the power saving signal.

Optionally, the network device may implicitly enable the terminal to learn a search space used to carry the power saving signal. For example, the network device may send configuration information of the search space to the terminal. If the configuration information of the search space includes a DCI format corresponding to the power saving signal, the search space is a search space used to carry the power saving signal.

In this embodiment of this application, the power saving signal is used to indicate power saving information. Optionally, the power saving information includes at least one of the following:

(1) Whether the terminal monitors a PDCCH in a DRX cycle associated with the power saving signal: The power saving signal may be used to indicate the terminal to monitor the PDCCH in the DRX cycle associated with the power saving signal. Alternatively, the power saving signal may be used to indicate the terminal not to monitor the PDCCH in the DRX cycle associated with the power saving signal. "Whether to monitor the PDCCH in the DRX cycle" may also be equivalently expressed as "whether to monitor the PDCCH in on duration of DRX".

It may be understood that, when the power saving signal is used to indicate the terminal not to monitor the PDCCH in the DRX cycle associated with the power saving signal, the terminal does not monitor the PDCCH, thereby reducing power consumption of the terminal. The PDCCH herein includes at least a PDCCH used to schedule uplink data: a PUSCH or downlink data: a PDSCH, that is, a PDCCH carrying a DCI format 0-0, a DCI format 0-1, a DCI format 1-0, and a DCI format 1-1. The PDCCH may further include a PDCCH with another function, for example, a PDCCH carrying a DCI format 2-0 and/or a DCI format 2-1 and/or a DCI format 2-2 and/or a DCI format 2-3.

(2) Minimum scheduling time interval indication: The minimum scheduling time interval indication may be a minimum K0 value or a minimum K2 value. K0 is a time interval between a slot in which a PDCCH is located and a slot in which a PDSCH scheduled by using the PDCCH is located. K2 is a time interval between a slot in which a PDCCH is located and a slot in which a PDSCH scheduled by using the PDCCH is located.

(3) Channel state information (channel state information, CSI) measurement trigger indication: The CSI measurement trigger indication is used to trigger the terminal to perform CSI-RS measurement and CSI reporting.

(4) Bandwidth part (bandwidth part, BWP) switching indication: The BWP switching indication is used to indicate the terminal to switch between BWPs. In other words, the BWP switching indication is used to indicate the terminal to switch from a first BWP to a second BWP.

It may be understood that the first BWP is a BWP used by the terminal before the switching, and the second BWP is a BWP used by the terminal after the switching. The second BWP may be preconfigured, or may be determined by the terminal based on the BWP switching indication. This is not limited in this embodiment of this application.

(5) Search space and/or control resource set (control resource set, CORESET) that the terminal needs to monitor in the DRX cycle associated with the power saving signal For example, the network device configures a search space #1, a search space #1, and a search space #3 for the terminal, and the power saving signal may indicate that the terminal needs to monitor the search space #1 and the search space #3.

For example, the network device configures a CORESET #1, a CORESET #2, and a CORESET #3 for the terminal, and the power saving signal may indicate that the terminal needs to monitor the CORESET #1.

It may be understood that, for a plurality of search spaces and/or CORESETs configured by the network device for the terminal, the power saving signal may indicate the terminal to monitor only some of the search spaces and/or CORESETs, so as to reduce a quantity of search spaces and/or CORESETs that the terminal needs to monitor, thereby reducing power consumption of the terminal.

(6) Monitoring cycle in which the terminal monitors the PDCCH in the DRX cycle associated with the power saving signal (7) Skipping duration (skipping duration) used by the terminal in the DRX cycle associated with the power saving signal: The skipping duration is duration in which the terminal skips monitoring the PDCCH. The skipping duration may include monitoring occasions of one or more slots/subframes/PDCCHs. This is not limited in this embodiment of this application.

The foregoing is an example of the power saving information, and this embodiment of this application is not limited thereto.

Optionally, the power saving signal may include one or more information elements, and one information element is used to carry one piece of power saving information. In this way, the power saving signal may indicate a plurality of pieces of power saving information simultaneously.

Optionally, the power saving signal includes an index, and the index may be implemented by using one or more bits. Power saving information indicated by using the power saving signal varies with a value of the index included in the power saving signal. That is, the value of the index corresponds to one or more pieces of power saving information.

For example, Table 1 shows a correspondence between a value of an index and power saving information. For example, with reference to Table 1, when the value of the index included in the power saving signal is 00, the power saving signal is used to indicate the terminal to monitor the PDCCH. When the value of the index included in the power saving signal is 01, the power saving signal is used to indicate the terminal not to monitor the PDCCH. When the value of the index included in the power saving signal is 10, the power saving signal is used to indicate the terminal to switch between BWPs. When the value of the index included in the power saving signal is 11, the power saving signal is used to indicate the terminal not to monitor the PDCCH but to switch between BWPs.

TABLE 1

| Value of the index | Power saving information |
| --- | --- |
| 00 | Monitor the PDCCH |
| 01 | Not to monitor the PDCCH |
| 10 | Switch between BWPs |
| 11 | Not to monitor the PDCCH but switch between BWPs |

S102: When using the long DRX cycle, the terminal monitors the power saving signal in the first search space, and does not monitor the power saving signal in the second search space.

Optionally, step S102 may also be expressed as follows: The terminal monitors, in the first search space, the power saving signal associated with the long DRX cycle, and does not monitor, in the second search space, the power saving signal associated with the short DRX cycle.

Optionally, the terminal may implicitly determine the first search space and the second search space. For example, when the network device configures two search spaces used to carry a power saving signal for the terminal, the terminal may determine the first search space and the second search space based on monitoring cycles of the two search spaces. For example, a search space with a longer monitoring cycle in the two search spaces is used as the first search space, and a search space with a shorter monitoring cycle in the two search spaces is used as the second search space. Alternatively, a search space with a same monitoring cycle as the long DRX cycle is used as the first search space, and a search space with a same monitoring cycle as the short DRX cycle is used as the second search space.

Optionally, the terminal may explicitly determine the first search space and the second search space. For example, the terminal receives first configuration information sent by the network device, and the first configuration information is used to configure related information of the power saving signal. The first configuration information includes first indication information and second indication information, the first indication information is used to indicate an identifier/an index value/a name of the first search space, and the second indication information is used to indicate an identifier/an index value/a name of the second search space. In this way, the terminal may determine the first search space based on the first indication information, and determine the second search space based on the second indication information. For example, the first indication information is SearchSpaceIdForLongCycle, and is used to indicate an identifier/an index value/a name of a search space that needs to be monitored when the terminal uses the long DRX cycle, and the second indication information is SearchSpaceIdForShortCycle, and is used to indicate an identifier/an index value/a name of a search space that needs to be monitored when the terminal uses the short DRX cycle.

Optionally, the first configuration information may further include a first radio network temporary identifier (radio network temporary identifier, RNTI), and the first RNTI is used to identify the terminal that receives the power saving signal. In this way, after the terminal learns of the first RNTI of the terminal, the terminal may determine, based on the first RNTI of the terminal, a power saving signal that is sent to the terminal, so as to avoid incorrectly receiving a power saving signal sent to another terminal. It may be understood that the first RNTI may have another name, for example, a power saving RNTI (power saving RNTI, PS-RNTI). This is not limited in this embodiment of this application.

In this embodiment of this application, a monitoring cycle of the first search space may be the same as the long DRX cycle in terms of a time length, and a monitoring cycle of the second search space may be the same as the short DRX cycle in terms of a time length. In this way, a monitoring occasion of the first search space and a monitoring occasion of the second search space can occur at proper locations of the DRX cycle (for example, before on duration of the DRX cycle), and the terminal can normally monitor the power saving signal in the first search space/the second search space.

Certainly, a monitoring cycle of the first search space may alternatively be different from the long DRX cycle in terms of a time length, and a monitoring cycle of the second search space may alternatively be different from the short DRX cycle in terms of a time length. This embodiment of this application is not limited thereto.

In this embodiment of this application, a monitoring offset value of the first search space may be the same as a monitoring offset value of the second search space. Alternatively, a monitoring offset value of the first search space may be different from a monitoring offset value of the second search space.

It should be noted that, when the terminal uses the long DRX cycle, the network device may determine, based on an actual requirement, whether to send the power saving signal in the first search space. However, regardless of whether the network device sends the power saving signal, the terminal needs to monitor the power saving signal in the first search space.

S103: When the terminal uses a short DRX cycle, the network device sends a power saving signal in a second search space, and does not send the power saving signal in a first search space.

Optionally, step S103 may be expressed as follows: The network device sends, in the second search space, the power saving signal associated with the short DRX cycle, and does not send, in the first search space, the power saving signal associated with the short DRX cycle.

S104: When using the short DRX cycle, the terminal monitors the power saving signal in the second search space, and does not monitor the power saving signal in the first search space.

Optionally, step S104 may also be expressed as follows. The terminal monitors, in the second search space, the power saving signal associated with the short DRX cycle, and does not monitor, in the first search space, the power saving signal associated with the short DRX cycle.

It should be noted that, when the terminal uses the short DRX cycle, the network device may determine, based on an actual requirement, whether to send the power saving signal in the second search space. However, regardless of whether the network device sends the power saving signal, the terminal needs to monitor the power saving signal in the second search space.

Based on the technical solution shown in FIG. 5, when the terminal uses the long DRX cycle, the terminal monitors the power saving signal in the first search space, and does not monitor the power saving signal in the second search space. When the terminal uses the short DRX cycle, the terminal monitors the power saving signal in the second search space, and does not monitor the power saving signal in the first search space. In this way, the terminal can normally monitor the power saving signal in the search space in a scenario in which the power saving signal can be applied to the long DRX cycle and the short DRX cycle. In addition, regardless of the long DRX cycle or the short DRX cycle, the terminal needs to monitor the power saving signal in only one search space, so that a quantity of search spaces that the terminal needs to monitor is reduced, and power consumption of the terminal is reduced.

Figure 6:
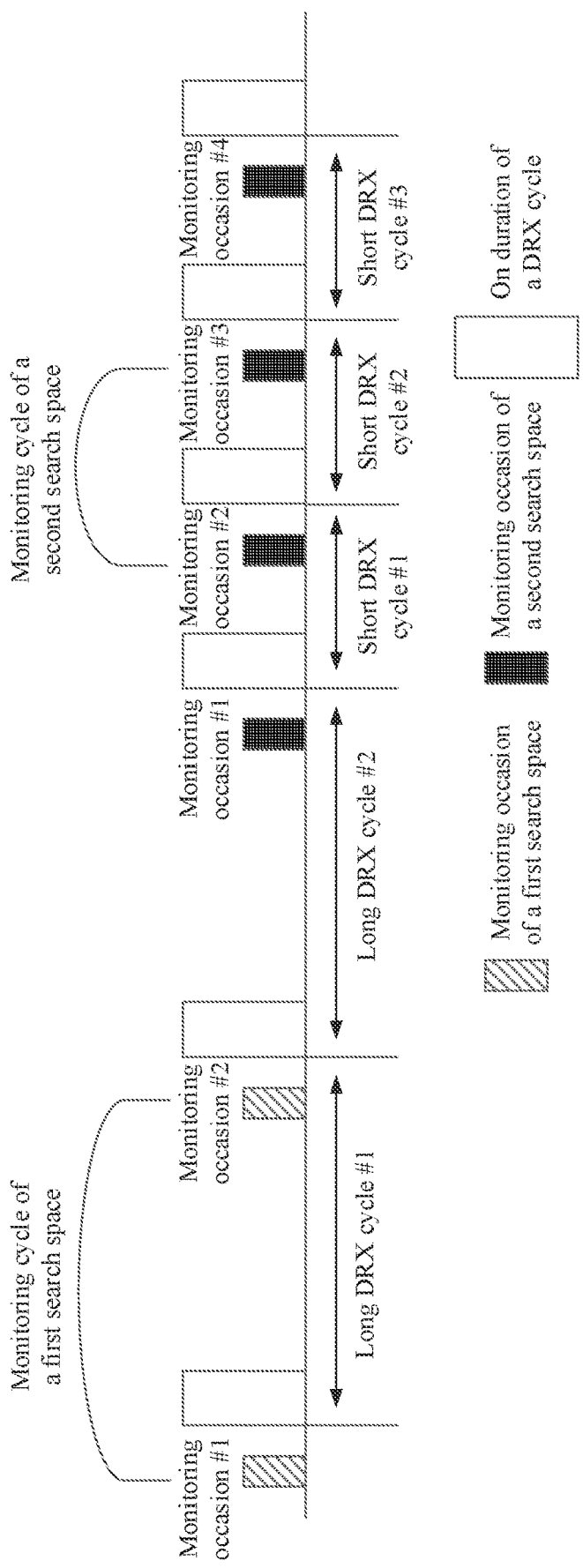
FIG. 6 is a schematic diagram of a DRX cycle and a monitoring occasion of a search space according to an embodiment of this application.

The embodiment shown in FIG. 5 is described below by using an example with reference to FIG. 6.

The terminal enters a mode of the long DRX cycle before a long DRX cycle #1. Therefore, the network device sends a power saving signal in the first search space on a monitoring occasion #1 and a monitoring occasion #2 of the first search space. Correspondingly, the terminal monitors the power saving signal in the first search space on the monitoring occasion #1 and the monitoring occasion #2 of the first search space. The terminal enters a mode of the short DRX cycle before a short DRX cycle #1. Therefore, the network device sends a power saving signal on a monitoring occasion #1, a monitoring occasion #2, a monitoring occasion #3, and a monitoring occasion #4 of the second search space. Correspondingly, the terminal monitors the power saving signal on the monitoring occasion #1, the monitoring occasion #2, the monitoring occasion #3, and the monitoring occasion #4 of the second search space.

In other words, the first search space is used to carry a power saving signal associated with the long DRX cycle, and the second search space is used to carry a power saving signal associated with the short DRX cycle. Therefore, the long DRX cycle #1 is used as an example. The network device sends, in the first search space on the monitoring occasion #1 of the first search space, a power saving signal associated with the long DRX cycle #1. Correspondingly, the terminal monitors, in the first search space on the monitoring occasion #1 of the first search space, the power saving signal associated with the long DRX cycle #1. The short DRX cycle #1 is used as an example. The network device sends, in the second search space on the monitoring occasion #1 of the second search space, a power saving signal associated with the short DRX cycle #1. Correspondingly, the terminal monitors, in the second search space on the monitoring occasion #1 of the second search space, the power saving signal associated with the short DRX cycle #1.

The following describes the technical solutions of this application with reference to embodiments of some actual application scenarios.

Figure 7:
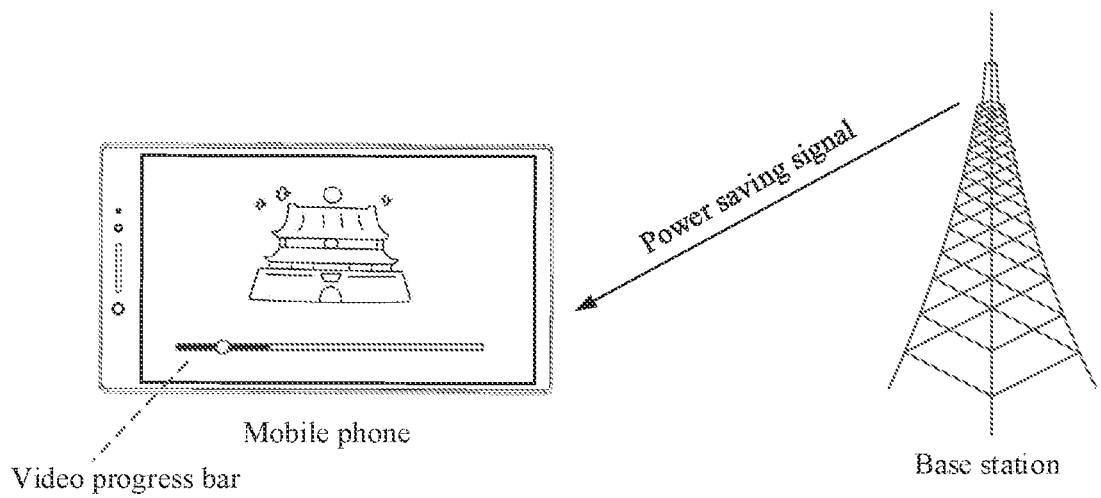
FIG. 7 is a schematic diagram of a scenario of communication between a mobile phone and a base station according to an embodiment of this application.

For example, with reference to FIG. 7, when a user uses a mobile phone to watch an online video, a requirement on a service delay is relatively low. In this case, the mobile phone may use a long DRX cycle, and a length of the long DRX cycle may be 640 ms, that is, the mobile phone monitors, every 640 ms (that is, on duration of the short DRX cycle), scheduling information sent by a base station. If the mobile phone has finished buffering the video data and does not need to receive the video data temporarily, the mobile phone does not need to receive, within a period of time (for example, several long DRX cycles), scheduling information sent by the base station. In this case, the base station may send a power saving signal to the mobile phone, to indicate that the mobile phone may not monitor scheduling information in one or more long DRX cycles. Specifically, the base station may send a power saving signal in the first search space, and does not send the power saving signal in the second search space. Correspondingly, the mobile phone may monitor the power saving signal in the first search space, and does not monitor the power saving signal in the second search space.

Figure 8:
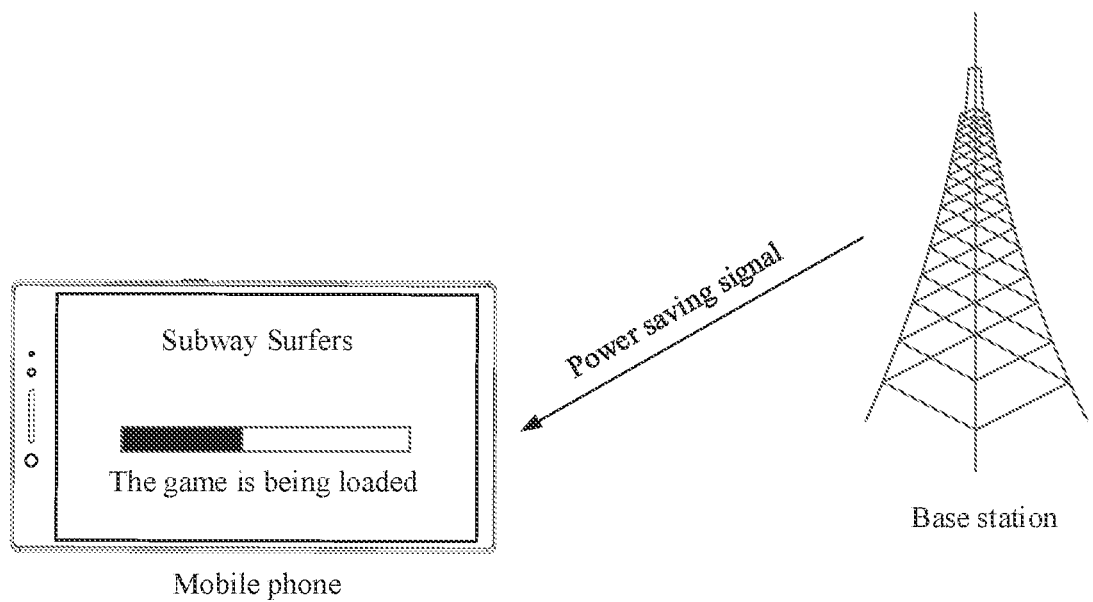
FIG. 8 is a schematic diagram of a scenario of communication between a mobile phone and a base station according to an embodiment of this application.

For example, with reference to FIG. 8, when a user uses a mobile phone to play an online game, a requirement on a service delay is relatively high. In this case, the mobile phone may use a short DRX cycle, and a length of the short DRX cycle may be 40 ms, that is, the mobile phone monitors, every 40 ms (that is, on duration of the short DRX cycle), scheduling information sent by a base station. In a game loading process, the mobile phone does not need to perform data interaction with the base station temporarily. In this case, the base station may send a power saving signal to the mobile phone, to indicate that the mobile phone may not monitor scheduling information in one or more short DRX cycles. Specifically, the base station may send a power saving signal in the second search space, and does not send the power saving signal in the first search space. Correspondingly, the mobile phone may monitor the power saving signal in the second search space, and does not monitor the power saving signal in the first search space.

Figure 9:
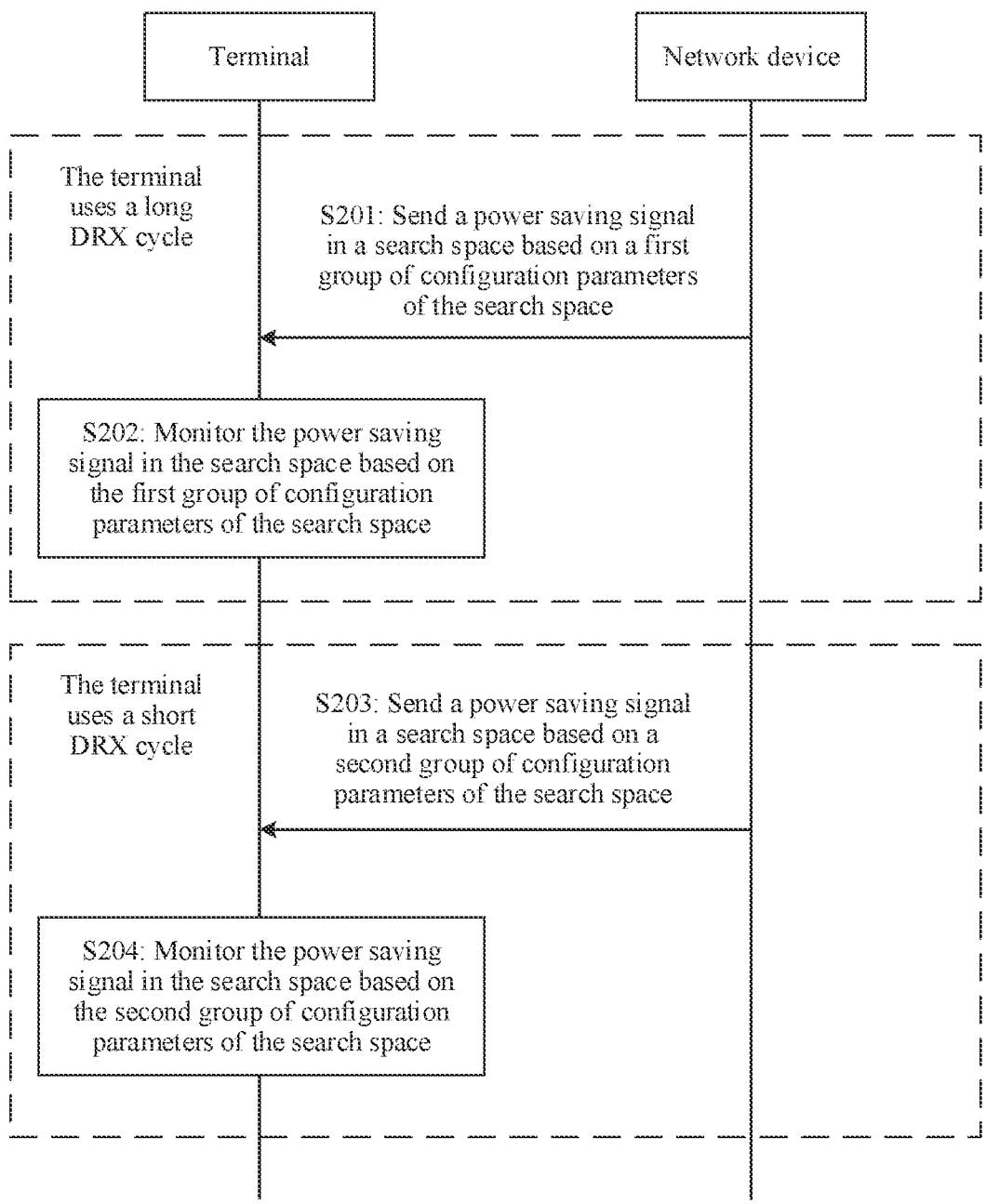
FIG. 9 is a flowchart of another search space monitoring method according to an embodiment of this application.

FIG. 9 shows another search space monitoring method according to an embodiment of this application. The method includes the following steps.

S201: When a terminal uses a long DRX cycle, a network device sends a power saving signal in a search space based on a first group of configuration parameters of the search space.

Optionally, step S201 may be expressed as follows: The network device sends, in the search space based on the first group of configuration parameters of the search space, the power saving signal associated with the long DRX cycle.

For related descriptions of the power saving signal, refer to the descriptions in the embodiment shown in FIG. 5. Details are not described herein again.

In this embodiment of this application, the first group of configuration parameters corresponds to the long DRX cycle. A monitoring cycle in the first group of configuration parameters may be the same as the long DRX cycle in terms of a time length. Alternatively, a monitoring cycle in the first group of configuration parameters may be different from the long DRX cycle in terms of a time length.

The search space is a search space used to carry the power saving signal. For a method for configuring, by the network device, the search space used to carry the power saving signal for the terminal, refer to related descriptions in the embodiment shown in FIG. 5. Details are not described herein again.

S202: When using the long DRX cycle, the terminal monitors the power saving signal in the search space based on the first group of configuration parameters of the search space.

Optionally, step S202 may be expressed as follows: The terminal monitors, in the search space based on the first group of configuration parameters of the search space, the power saving signal associated with the long DRX cycle.

It should be noted that, when the terminal uses the long DRX cycle, the network device may determine, based on an actual requirement, whether to send the power saving signal in the search space. However, regardless of whether the network device sends the power saving signal, the terminal needs to monitor the power saving signal in the search space based on the first group of configuration parameters of the search space.

S203: When the terminal uses a short DRX cycle, the network device sends a power saving signal in a search space based on a second group of configuration parameters of the search space.

Optionally, step S203 may be expressed as follows: The network device sends, in the search space based on the second group of configuration parameters of the search space, the power saving signal associated with the short DRX cycle.

In this embodiment of this application, the second group of configuration parameters corresponds to the short DRX cycle. A monitoring cycle in the second group of configuration parameters may be the same as the short DRX cycle in terms of a time length. Alternatively, a monitoring cycle in the second group of configuration parameters may be different from the short DRX cycle in terms of a time length.

It should be noted that the first group of configuration parameters is different from the second group of configuration parameters. That the first group of configuration parameters is different from the second group of configuration parameters specifically means that the first group of configuration parameters is different from the second group of configuration parameters in at least one configuration parameter. For example, a monitoring cycle in the first group of configuration parameters is different from a monitoring cycle in the second group of configuration parameters.

Optionally, a monitoring offset value in the first group of configuration parameters is different from a monitoring offset value in the second group of configuration parameters. Alternatively, a monitoring offset value in the first group of configuration parameters is the same as a monitoring offset value in the second group of configuration parameters.

Optionally, the first group of configuration parameters and the second group of configuration parameters are configured in at least the following two manners:

Manner 1: The network device sends configuration information of the search space to the terminal, so that the terminal receives the configuration information of the search space that is sent by the network device. The configuration information of the search space includes the first group of configuration parameters and the second group of configuration parameters.

For example, the configuration information of the search space may be implemented in the following format, to configure the monitoring cycle and the monitoring offset value in the first group of configuration parameters, and the monitoring cycle and the monitoring offset value in the second group of configuration parameters.

Cond Setup is used to indicate that a parameter corresponding to Cond Setup is mandatory when a new search space is created. In other cases, the parameter corresponding to Cond Setup is optional. In addition, the parameter corresponding to Cond Setup needs to be retained after being configured.

The parameter corresponding to Cond Setup may be monitoringSlotPeriodicityAndOffsetForLongDRX and monitoringSlotPeriodicityAndOffsetForShortDRX.

It should be noted that, when a target configuration parameter in the first group of configuration parameters is the same as a target configuration parameter in the second group of configuration parameters, the configuration information of the search space may include only one target configuration parameter, thereby reducing signaling overheads of the configuration information of the search space. In this case, the target configuration parameter included in the configuration information of the search space is applicable to the first group of configuration parameters and the second group of configuration parameters.

The target configuration parameter may be any configuration parameter of the search space, for example, a time

```
SearchSpace ::=                              SEQUENCE {
...
monitoringSlotPeriodicityAndOffsetForLongDRX    CHOICE {
    sl1                 NULL,
    sl2                 INTEGER (0..1),
    sl4                 INTEGER (0..3),
    sl5                 INTEGER (0..4),
    sl8                 INTEGER (0..7),
    sl10                INTEGER (0..9),
    sl16                INTEGER (0..15),
    sl20                INTEGER (0..19),
    sl40                INTEGER (0..39),
    sl80                INTEGER (0..79),
    sl160               INTEGER (0..159),
    sl320               INTEGER (0..319),
    sl640               INTEGER (0..639),
    sl1280              INTEGER (0..1279),
    sl2560              INTEGER (0..2559)
} OPTIONAL,              -- Cond Setup
monitoringSlotPeriodicityAndOffsetForShortDRX   CHOICE {
    sl1                 NULL,
    sl2                 INTEGER (0..1),
    sl4                 INTEGER (0..3),
    sl5                 INTEGER (0..4),
    sl8                 INTEGER (0..7),
    sl10                INTEGER (0..9),
    Sl16                INTEGER (0..15),
    sl20                INTEGER (0..19),
    sl40                INTEGER (0..39),
    sl80                INTEGER (0..79),
    sl160               INTEGER (0..159),
    sl320               INTEGER (0..319),
    sl640               INTEGER (0..639),
    sl1280              INTEGER (0..1279),
    sl2560              INTEGER (0..2559)
} OPTIONAL,              -- Cond Setup
...
}                                            OPTIONAL, -- Cond Setup
```

Herein, monitoringSlotPeriodicityAndOffsetForLongDRX is used to indicate a monitoring cycle and a monitoring offset value that correspond to the long DRX cycle, that is, indicate the monitoring cycle and the monitoring offset value in the first group of configuration parameters.

monitoringSlotPeriodicityAndOffsetForShortDRX is used to indicate a monitoring cycle and a monitoring offset value that correspond to the short DRX cycle, that is, indicate the monitoring cycle and the monitoring offset value in the second group of configuration parameters.

domain length of the search space or a type of the search space. This is not limited in this embodiment of this application.

Manner 2: The network device sends configuration information of the search space to the terminal, so that the terminal receives the configuration information of the search space that is sent by the network device. In addition, the network device sends indication information to the terminal, so that the terminal receives the indication information sent by the network device.

The configuration information of the search space is used to indicate a parameter other than a monitoring cycle and a monitoring offset value in the first group of configuration parameters, and a parameter other than a monitoring cycle and a monitoring offset value in the second group of configuration parameter.

The indication information is used to indicate the monitoring cycle and the monitoring offset value in the first group of configuration parameters, and the monitoring cycle and the monitoring offset value in the second group of configuration parameters. The indication information includes monitoringSlotPeriodicityAndOffsetForLongDRX and monitoringSlotPeriodicityAndOffsetForShortDRX. Optionally, the indication information may be carried in configuration information of the power saving signal (that is, the first configuration information mentioned above).

It may be understood that, in this case, when the configuration information of the search space uses SearchSpace IE, SearchSpace IE does not include monitoringSlotPeriodicityAndOffset, or monitoringSlotPeriodicityAndOffset included in SearchSpace IE is not read by the terminal. In other words, the terminal does not determine the monitoring cycle and the monitoring offset value of the search space based on monitoringSlotPeriodicityAndOffset included in SearchSpace IE.

S204: When using the short DRX cycle, the terminal monitors the power saving signal in the search space based on the second group of configuration parameters of the search space.

Optionally, step S204 may be expressed as follows: The terminal monitors, in the search space based on the second group of configuration parameters of the search space, the power saving signal associated with the short DRX cycle.

It should be noted that, when the terminal uses the short DRX cycle, the network device may determine, based on an actual requirement, whether to send the power saving signal in the search space. However, regardless of whether the network device sends the power saving signal, the terminal needs to monitor the power saving signal in the search space based on the second group of configuration parameters of the search space.

Based on the technical solution shown in FIG. 9, when using the long DRX cycle, the terminal uses the first group of configuration parameters of the search space, to meet a requirement of the terminal for a cycle of monitoring the power saving signal in the long DRX cycle. When using the short DRX cycle, the terminal uses the second group of configuration parameters of the search space, to meet a requirement of the terminal for a cycle of monitoring the power saving signal in the short DRX cycle. In other words, in a scenario in which the power saving signal can be applied to the long DRX cycle and the short DRX cycle, for a different DRX cycle, the terminal may use a group of configuration parameters corresponding to the DRX cycle, to ensure that the terminal can normally monitor the power saving signal in the search space.

Figure 10:
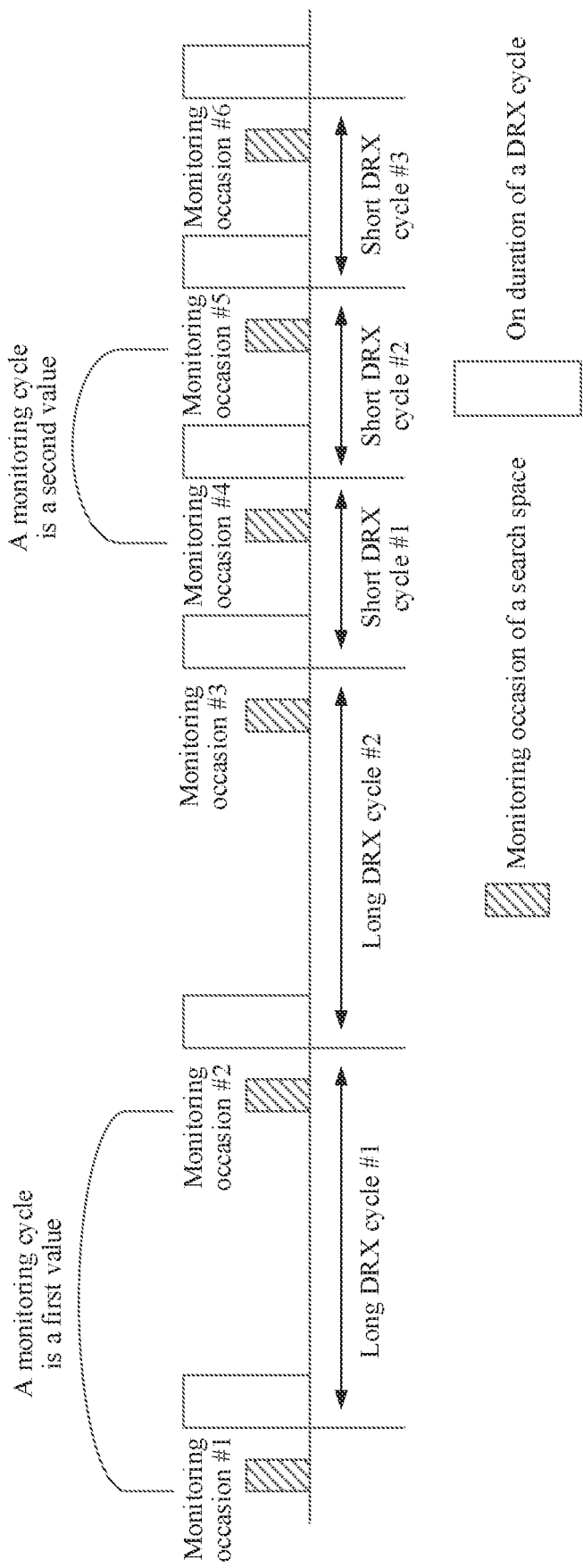
FIG. 10 is another schematic diagram of a DRX cycle and a monitoring occasion of a search space according to an embodiment of this application.

The embodiment shown in FIG. 9 is described below by using an example with reference to FIG. 10.

The terminal enters a mode of the long DRX cycle before a long DRX cycle #1. Therefore, the network device determines, based on the first group of configuration parameters of the search space (for example, the monitoring cycle in the first group of configuration parameters is a first value), that monitoring occasions of the search space are a monitoring occasion #1 and a monitoring occasion #2, so that the network device sends a power saving signal in the search space on the monitoring occasion #1 and the monitoring occasion #2 of the search space. Correspondingly, the terminal monitors the power saving signal in the search space on the monitoring occasion #1 and the monitoring occasion #2 of the search space. The terminal enters a mode of the short DRX cycle before a short DRX cycle #1. Therefore, the network device determines, based on the second group of configuration parameters of the search space (for example, the monitoring cycle in the second group of configuration parameters is a first value), that monitoring occasions of the search space are a monitoring occasion #3, a monitoring occasion #4, a monitoring occasion #5, and a monitoring occasion #6, so that the network device sends a power saving signal in the search space on the monitoring occasion #3, the monitoring occasion #4, the monitoring occasion #5, and the monitoring occasion #6 of the search space. Correspondingly, the terminal monitors the power saving signal in the search space on the monitoring occasion #3, the monitoring occasion #4, the monitoring occasion #5, and the monitoring occasion #6 of the search space.

In other words, a long DRX cycle #2 is used as an example. The network device determines, based on the first group of configuration parameters of the search space (for example, the monitoring cycle in the first group of configuration parameters is a first value), that a monitoring occasion of the search space is a monitoring occasion #2, so that the network device sends, in the search space on the monitoring occasion #2 of the search space, a power saving signal associated with the long DRX cycle #2. Correspondingly, the terminal monitors, in the search space on the monitoring occasion #2 of the search space, the power saving signal associated with the long DRX cycle #2. A short DRX cycle #2 is used as an example. The network device determines, based on the second group of configuration parameters of the search space (for example, the monitoring cycle in the first group of configuration parameters is a first value), that a monitoring occasion of the search space is a monitoring occasion #4, so that the network device sends, in the search space on the monitoring occasion #4 of the search space, a power saving signal associated with the short DRX cycle #2. Correspondingly, the terminal monitors, in the search space on the monitoring occasion #4 of the search space, the power saving signal associated with the short DRX cycle #2.

The following describes this solution with reference to embodiments of some actual application scenarios.

For example, with reference to FIG. 7, when a user uses a mobile phone to watch an online video, a requirement on a service delay is relatively low. In this case, the mobile phone may use a long DRX cycle, and a length of the long DRX cycle may be 640 ms, that is, the mobile phone monitors, every 640 ms (that is, on duration of the short DRX cycle), scheduling information sent by a base station. If the mobile phone has finished buffering the video data and does not need to receive the video data temporarily, the mobile phone does not need to receive, within a period of time (for example, several long DRX cycles), scheduling information sent by the base station. In this case, the base station may send a power saving signal to the mobile phone, to indicate that the mobile phone may not monitor scheduling information in one or more long DRX cycles. Specifically, the base station may determine a monitoring occasion of the search space based on the first group of configuration parameters of the search space, and send a power saving signal on the monitoring occasion of the search space. Correspondingly, the mobile phone may determine the monitoring occasion of the search space based on the first group of configuration parameters of the search space, and monitor the power saving signal on the monitoring occasion of the search space.

For example, with reference to FIG. 8, when a user uses a mobile phone to play an online game, a requirement of the online game on a service delay is relatively high. In this case, the mobile phone may use a short DRX cycle, and a length of the short DRX cycle may be 40 ms, that is, the mobile phone monitors, every 40 ms (that is, on duration of the short DRX cycle), scheduling information sent by a base station. In a game loading process, the mobile phone does not need to perform data interaction with the base station temporarily. In this case, the base station may send a power saving signal to the mobile phone, to indicate that the mobile phone may not monitor scheduling information in one or more short DRX cycles. Specifically, the base station may determine a monitoring occasion of the search space based on the second group of configuration parameters of the search space, and send a power saving signal on the monitoring occasion of the search space. Correspondingly, the mobile phone may determine the monitoring occasion of the search space based on the second group of configuration parameters of the search space, and monitor the power saving signal on the monitoring occasion of the search space.

Figure 11:
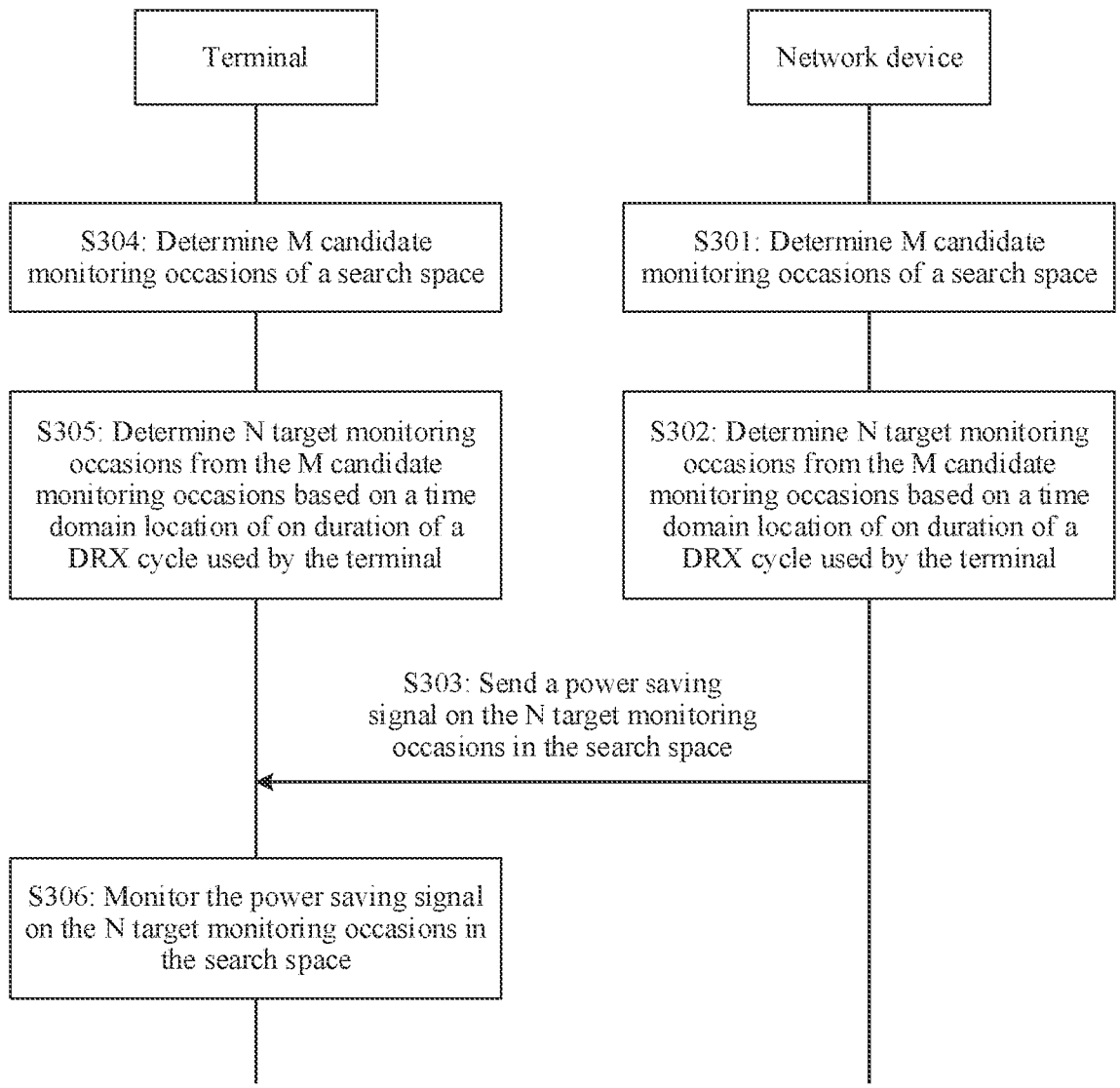
FIG. 11 is a flowchart of another search space monitoring method according to an embodiment of this application.

FIG. 11 shows another search space monitoring method according to an embodiment of this application. The method includes the following steps.

S301: A network device determines M candidate monitoring occasions of a search space.

For related descriptions of a power saving signal, refer to the descriptions in the embodiment shown in FIG. 5. Details are not described herein again.

The search space is a search space used to carry the power saving signal. For a method for configuring, by the network device, the search space used to carry the power saving signal for the terminal, refer to related descriptions in the embodiment shown in FIG. 5. Details are not described herein again.

It should be noted that the monitoring occasion includes a period of consecutive time units in time domain, and the time unit may be an OFDM symbol. The network device may send signaling such as a PDCCH on the monitoring occasion of the search space. Correspondingly, the terminal may monitor the search space on the monitoring occasion, to receive the signaling sent by the network device.

S302: The network device determines N target monitoring occasions from the M candidate monitoring occasions based on a time domain location of on duration of a DRX cycle used by the terminal.

The DRX cycle may be a DRX cycle associated with the power saving signal. Alternatively, the DRX cycle is a DRX cycle that is being used by the terminal or a DRX cycle that is to be used by the terminal.

N is a positive integer less than or equal to M.

Design 1: The target monitoring occasion is before the on duration of the DRX cycle used by the terminal, and is closest to the on duration of the DRX cycle used by the terminal.

Based on the design 1, the M candidate monitoring occasions may be determined based on configuration information of the search space, and M is a positive integer. For a method for determining the M candidate monitoring occasions, refer to the conventional technology. Details are not described herein.

Figure 12:
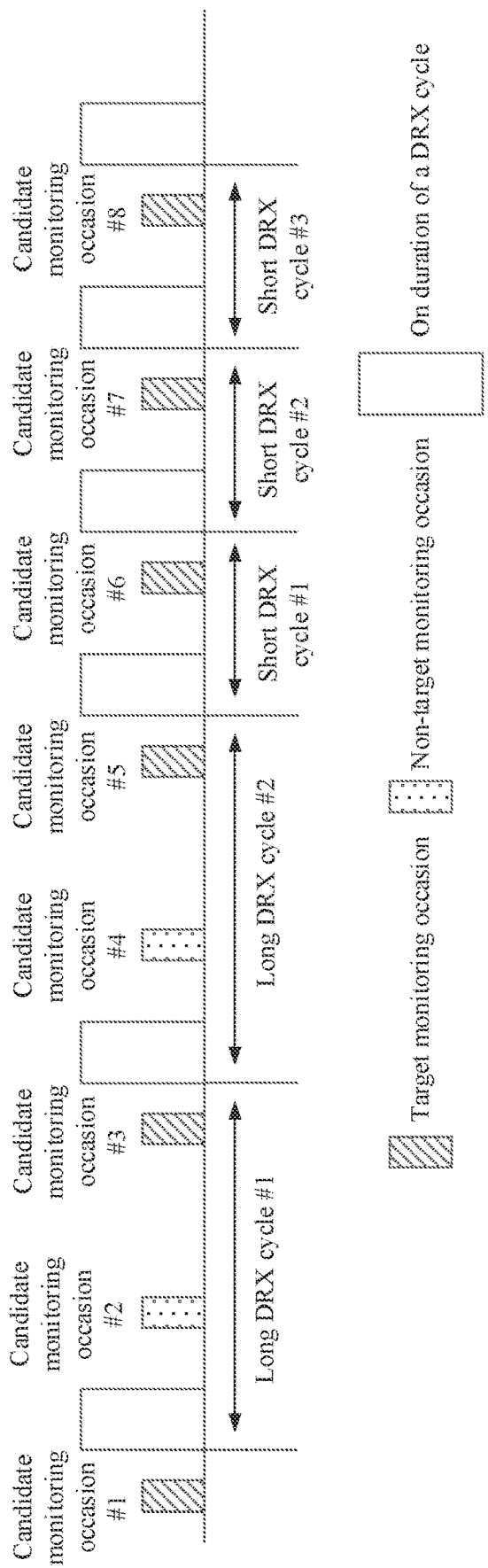
FIG. 12 is another schematic diagram of a DRX cycle and a monitoring occasion of a search space according to an embodiment of this application.

For example, with reference to FIG. 12, for a search space, a candidate monitoring occasion #1 to a candidate monitoring occasion #8 exist in time domain. For a long DRX cycle #1, the candidate monitoring occasion #1 is before on duration of the long DRX cycle #1 and is closest to the on duration of the long DRX cycle #1. Therefore, the candidate monitoring occasion #1 is the target monitoring occasion. For a long DRX cycle #2, the candidate monitoring occasion #3 is before on duration of the long DRX cycle #2 and is closest to the on duration of the long DRX cycle #2. Therefore, the candidate monitoring occasion #3 is the target monitoring occasion. For a short DRX cycle #1, the candidate monitoring occasion #5 is before on duration of the short DRX cycle #1 and is closest to the on duration of the short DRX cycle #1. Therefore, the candidate monitoring occasion #5 is the target monitoring occasion. By analogy, it may be determined that the candidate monitoring occasion #6, the candidate monitoring occasion #7, and the candidate monitoring occasion #8 are all target monitoring occasions.

Design 2: The N target monitoring occasions are N candidate monitoring occasions that are in the M candidate monitoring occasions and that are closest to the on duration of the DRX cycle.

Based on the design 2, for each of the M candidate monitoring occasions, a difference between a start time of the candidate monitoring occasion and a start time of the DRX cycle is greater than or equal to a first preset value; or a difference between an end time of the candidate monitoring occasion and a start time of the DRX cycle is greater than or equal to a first preset value.

In this embodiment of this application, the first preset value is defined in a standard, or is preconfigured by the network device for the terminal, or is determined through negotiation between the terminal and the network device.

The difference between the start time of the candidate monitoring occasion and the start time of the DRX cycle may be referred to as a first offset value. This is not limited in this embodiment of this application.

Based on the design 2, a value of N is preset (that is, defined in a standard), or is preconfigured by the network device for the terminal, or is determined through negotiation between the terminal and the network device.

Figure 13:
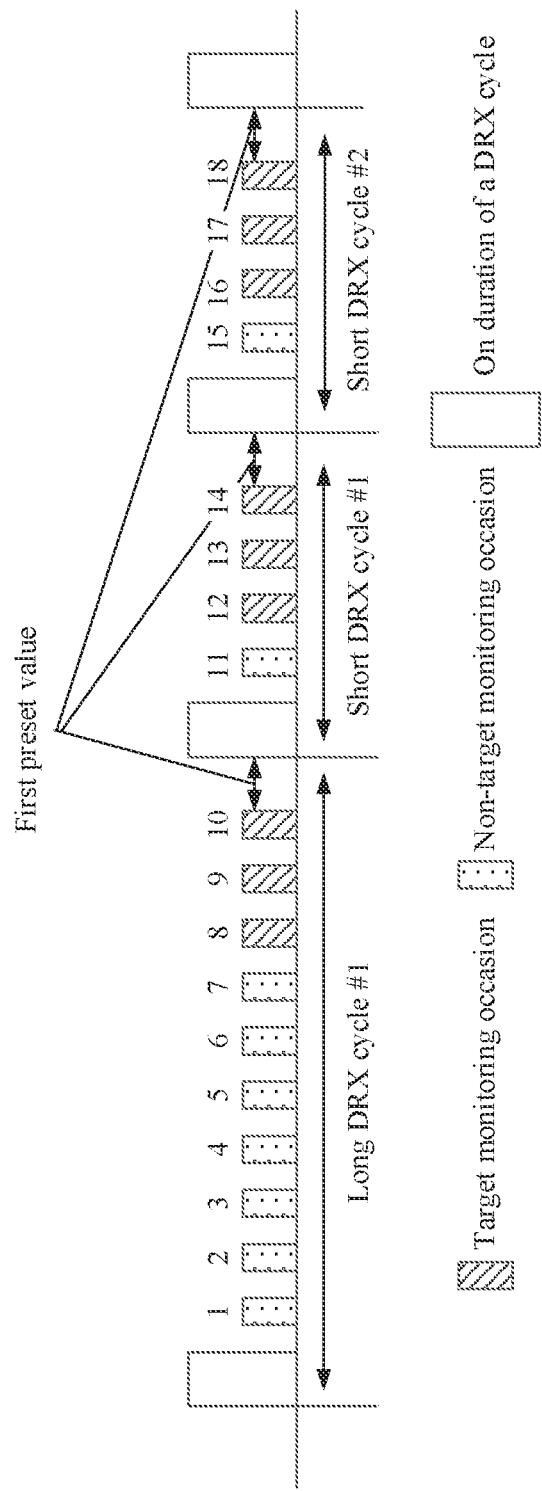
FIG. 13 is another schematic diagram of a DRX cycle and a monitoring occasion of a search space according to an embodiment of this application.

For example, with reference to FIG. 13, it is assumed that N is equal to 3. For a search space, a candidate monitoring occasion #1 to a candidate monitoring occasion #10 exist in opportunity for DRX of a long DRX cycle #1. Therefore, target monitoring occasions associated with on duration of a short DRX cycle #1 are the candidate monitoring occasion #8, the candidate monitoring occasion #9, and the candidate monitoring occasion #10. A candidate monitoring occasion #11 to a candidate monitoring occasion #14 exist in opportunity for DRX of the short DRX cycle #1. Therefore, target monitoring occasions associated with on duration of a short DRX cycle #2 are the candidate monitoring occasion #12, the candidate monitoring occasion #13, and the candidate monitoring occasion #14. A candidate monitoring occasion #15 to a candidate monitoring occasion #18 exist in opportunity for DRX of the short DRX cycle #2. Therefore, target monitoring occasions associated with on duration of a next DRX cycle are the candidate monitoring occasion #16, the candidate monitoring occasion #17, and the candidate monitoring occasion #18.

Design 3: The N monitoring occasions are N candidate monitoring occasions in a time window.

Based on the design 3, the M candidate monitoring occasions may be determined based on configuration information of the search space, and M is a positive integer. For a method for determining the M candidate monitoring occasions, refer to the conventional technology. Details are not described herein.

It may be understood that the time window is essentially a time period. For a current DRX cycle, a difference between a start time of a time window corresponding to the current DRX cycle and a start time of on duration of a next DRX cycle is equal to a second preset value, and a difference between an end time of the time window corresponding to the current DRX cycle and the start time of the on duration of the next DRX cycle is equal to a third preset value.

The difference between the start time of the time window and the start time of the on duration of the DRX cycle may be referred to as a second offset value. The difference between the end time of the time window and the start time of the on duration of the DRX cycle may be referred to as a third offset value. This is not limited in this embodiment of this application.

The second preset value is defined in a standard, or is preconfigured by the network device for the terminal, or is determined through negotiation between the terminal and the network device. The third preset value is defined in a standard, or is preconfigured by the network device for the terminal, or is determined through negotiation between the terminal and the network device.

That is, the network device may determine, based on the second offset value and the third offset value, the time window corresponding to the DRX cycle, and further determine the N target monitoring occasions from the M candidate monitoring occasions based on the time window in the DRX cycle.

In this way, N target monitoring occasions in a short DRX cycle are N candidate monitoring occasions in a time window corresponding to the short DRX cycle. N target monitoring occasions in a long DRX cycle are N candidate monitoring occasions in a time window corresponding to the long DRX cycle.

Based on the design 3, a value of N is not fixed. It may be understood that the value of N is directly proportional to a size of the time window (or a length of the time window).

Optionally, a second offset value corresponding to the long DRX cycle may be the same as a second offset value corresponding to the short DRX cycle, and a third offset value corresponding to the long DRX cycle may be the same as a third offset value corresponding to the short DRX cycle. Therefore, a length of the time window corresponding to the long DRX cycle may be the same as a length of the time window corresponding to the short DRX cycle.

Figure 14:
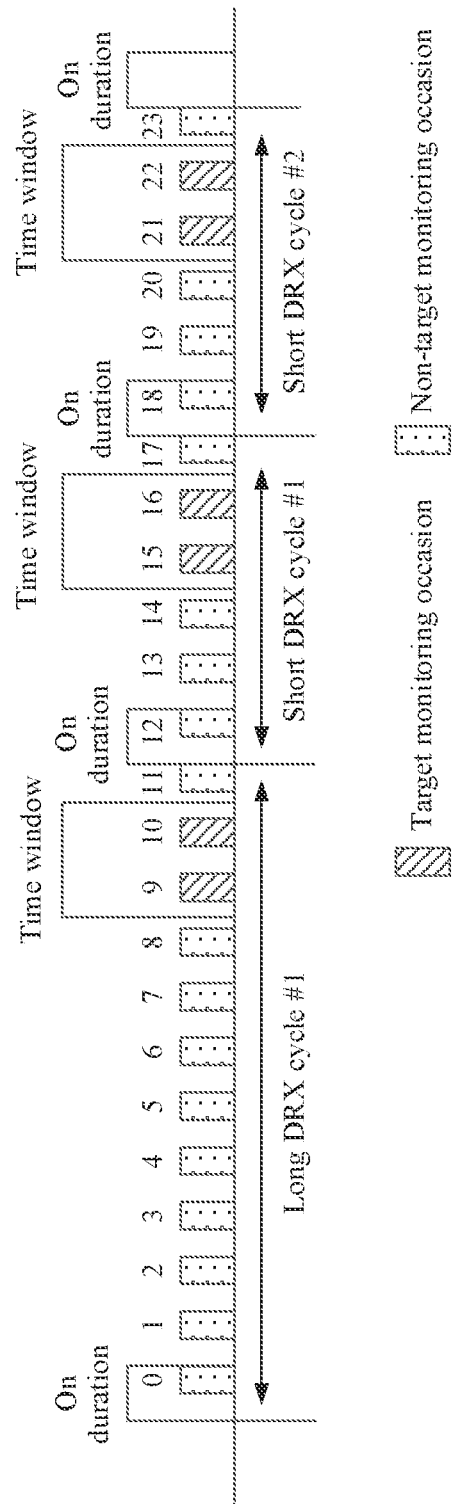
FIG. 14 is another schematic diagram of a DRX cycle and a monitoring occasion of a search space according to an embodiment of this application.

For example, with reference to FIG. 14, for a search space, a candidate monitoring occasion #0 to a candidate monitoring occasion #11 exist in opportunity for DRX of a long DRX cycle #1. The candidate monitoring occasion #9 and the candidate monitoring occasion #10 are in a time window, and therefore target monitoring occasions of the long DRX cycle #1 are the candidate monitoring occasion #9 and the candidate monitoring occasion #10. A candidate monitoring occasion #12 to a candidate monitoring occasion #17 exist in a short DRX cycle #1. The candidate monitoring occasion #15 and the candidate monitoring occasion #16 are in a time window, and therefore target monitoring occasions of the short DRX cycle #1 are the candidate monitoring occasion #15 and the candidate monitoring occasion #16. A candidate monitoring occasion #18 to a candidate monitoring occasion #23 exist in a short DRX cycle #2. The candidate monitoring occasion #21 and the candidate monitoring occasion #22 are in a time window, and therefore target monitoring occasions of the short DRX cycle #2 are the candidate monitoring occasion #21 and the candidate monitoring occasion #22.

Optionally, a second offset value corresponding to the long DRX cycle may be different from a second offset value corresponding to the short DRX cycle, and/or a third offset value corresponding to the long DRX cycle may be different from a third offset value corresponding to the short DRX cycle. Therefore, a length of the time window corresponding to the long DRX cycle may be different from a length of the time window corresponding to the short DRX cycle.

For example, a length of the time window corresponding to the long DRX cycle is greater than a length of the time window corresponding to the short DRX cycle.

Figure 15:
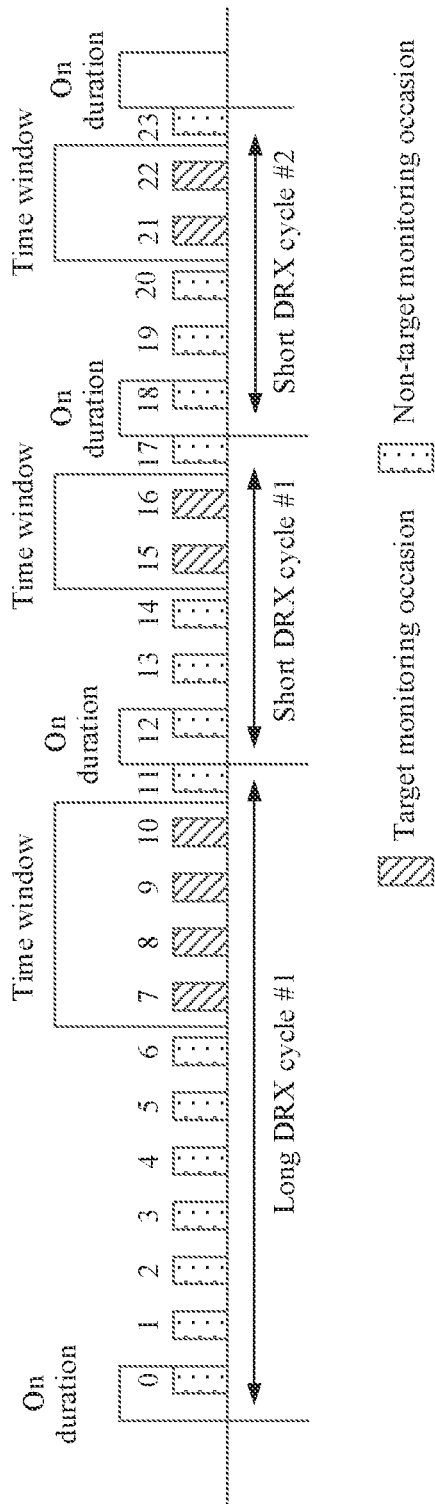
FIG. 15 is another schematic diagram of a DRX cycle and a monitoring occasion of a search space according to an embodiment of this application.

For example, with reference to FIG. 15, for a search space, a candidate monitoring occasion #0 to a candidate monitoring occasion #11 exist in opportunity for DRX of a long DRX cycle #1. The candidate monitoring occasion #7 to the candidate monitoring occasion #10 are in a time window, and therefore target monitoring occasions of the long DRX cycle #1 are the candidate monitoring occasion #7 to the candidate monitoring occasion #10. A candidate monitoring occasion #12 to a candidate monitoring occasion #17 exist in a short DRX cycle #1. The candidate monitoring occasion #15 and the candidate monitoring occasion #16 are in a time window, and therefore target monitoring occasions of the short DRX cycle #1 are the candidate monitoring occasion #15 and the candidate monitoring occasion #16. A candidate monitoring occasion #18 to a candidate monitoring occasion #23 exist in a short DRX cycle #2. The candidate monitoring occasion #21 and the candidate monitoring occasion #22 are in a time window, and therefore target monitoring occasions of the short DRX cycle #2 are the candidate monitoring occasion #21 and the candidate monitoring occasion #22.

Optionally, based on the foregoing design 1, design 2, or design 3, the monitoring cycle of the search space is less than or equal to the short DRX cycle, to ensure that when the terminal uses the short DRX cycle, one or more corresponding target monitoring occasions exist in each short DRX cycle, thereby preventing the terminal from missing detecting a power saving signal.

If the monitoring cycle of the search space is less than or equal to the short DRX cycle (that is, the monitoring cycle of the search space is the same as the short DRX cycle in terms of a time length), and a proper monitoring offset value is used for the search space, when the terminal uses the short DRX cycle, all monitoring occasions of the search space are target monitoring occasions. This helps reduce complexity of determining the target monitoring occasion by the terminal. In addition, because the long DRX cycle is generally L times the short DRX cycle, when the terminal uses the long DRX cycle, the terminal may also determine one or more target monitoring occasions from the L consecutive monitoring occasions. This also helps reduce complexity of determining the target monitoring occasion by the terminal. L is a positive integer.

Certainly, a monitoring cycle of the search space may alternatively be different from a short DRX cycle in terms of a time length. This is not limited in this embodiment of this application.

S303: The network device sends the power saving signal on the N target monitoring occasions in the search space.

It may be understood that the network device does not send the power saving signal on a non-target monitoring occasion of the search space.

S304: The terminal determines M candidate monitoring occasions of a search space.

S305: The terminal determines N target monitoring occasions from the M candidate monitoring occasions based on a time domain location of on duration of a DRX cycle.

For specific implementation of steps S304 and S305, refer to the descriptions in steps S301 and S302. Details are not described herein again.

S306: The terminal monitors the power saving signal on the N target monitoring occasions in the search space.

It may be understood that the terminal does not monitor the power saving signal on a non-target monitoring occasion of the search space, so as to reduce power consumption of the terminal.

It should be noted that the network device may determine, based on an actual requirement, whether to send the power saving signal in the search space. However, regardless of whether the network device sends the power saving signal, the terminal needs to monitor the power saving signal on the target monitoring occasion of the search space, so as to avoid missing detecting a power saving signal.

Based on the technical solution shown in FIG. 11, the terminal determines the target monitoring occasion based on the time domain location of the on duration of the DRX cycle. To be specific, when the terminal uses a long DRX cycle, the terminal may determine the target monitoring occasion based on a time domain location of on duration of the long DRX cycle. When the terminal uses a short DRX cycle, the terminal may determine the target monitoring occasion based on a time domain location of on duration of the short DRX cycle. The target monitoring occasion determined by the terminal is adapted to a DRX cycle used by the terminal. In this way, regardless of the long DRX cycle or the short DRX cycle, the terminal can normally monitor the power saving signal in the search space on a proper monitoring occasion (that is, the target monitoring occasion).

The following describes this solution with reference to embodiments of some actual application scenarios.

For example, with reference to FIG. 7, when a user uses a mobile phone to watch an online video, a requirement on a service delay is relatively low. In this case, the mobile phone may use a long DRX cycle, and a length of the long DRX cycle may be 640 ms, that is, the mobile phone monitors, every 640 ms (that is, on duration of the short DRX cycle), scheduling information sent by a base station. If the mobile phone has finished buffering the video data and does not need to receive the video data temporarily, the mobile phone does not need to receive, within a period of time (for example, several long DRX cycles), scheduling information sent by the base station. In this case, the base station may send a power saving signal to the mobile phone, to indicate that the mobile phone may not monitor scheduling information in one or more long DRX cycles. Specifically, the base station may determine M candidate monitoring occasions based on a configuration parameter of the search space, and then determine N target monitoring occasions from the M candidate monitoring occasions based on a time domain location of on duration of the long DRX cycle. Therefore, the base station sends the power saving signal on the N target monitoring occasions in the search space. Correspondingly, the mobile phone may determine M candidate monitoring occasions based on a configuration parameter of the search space, and then determine N target monitoring occasions from the M candidate monitoring occasions based on a time domain location of on duration of the long DRX cycle. Therefore, the mobile phone sends the power saving signal on the N target monitoring occasions in the search space.

For example, with reference to FIG. 8, when a user uses a mobile phone to play an online game, a requirement on a service delay is relatively high. In this case, the mobile phone may use a short DRX cycle, and a length of the short DRX cycle may be 40 ms, that is, the mobile phone monitors, every 40 ms (that is, on duration of the short DRX cycle), scheduling information sent by a base station. In a game loading process, the mobile phone does not need to perform data interaction with the base station temporarily. In this case, the base station may send a power saving signal to the mobile phone, to indicate that the mobile phone may not monitor scheduling information in one or more short DRX cycles. Specifically, the base station may determine M candidate monitoring occasions based on a configuration parameter of the search space, and then determine N target monitoring occasions from the M candidate monitoring occasions based on a time domain location of on duration of the short DRX cycle. Therefore, the base station sends the power saving signal on the N target monitoring occasions in the search space. Correspondingly, the mobile phone may determine M candidate monitoring occasions based on a configuration parameter of the search space, and then determine N target monitoring occasions from the M candidate monitoring occasions based on a time domain location of on duration of the short DRX cycle. Therefore, the mobile phone sends the power saving signal on the N target monitoring occasions in the search space.

The foregoing mainly describes the solutions provided in the embodiments of this application from a perspective of interaction between network elements. It may be understood that, to implement the foregoing functions, each of network elements such as the terminal and the network device includes a corresponding hardware structure and/or software module for performing each function. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, function modules of the terminal and the network device may be obtained through division based on the foregoing method examples. For example, each function module may be obtained through division based on each corresponding function, or two or more functions may be integrated into one processing module. The integrated module may be implemented in a form of hardware, or may be implemented in a form of a software function module. It should be noted that module division in the embodiments of this application is an example, and is merely a logical function division. During actual implementation, another division manner may be used. The following provides descriptions by using an example in which each function module is obtained through division based on a corresponding function.

Figure 16:
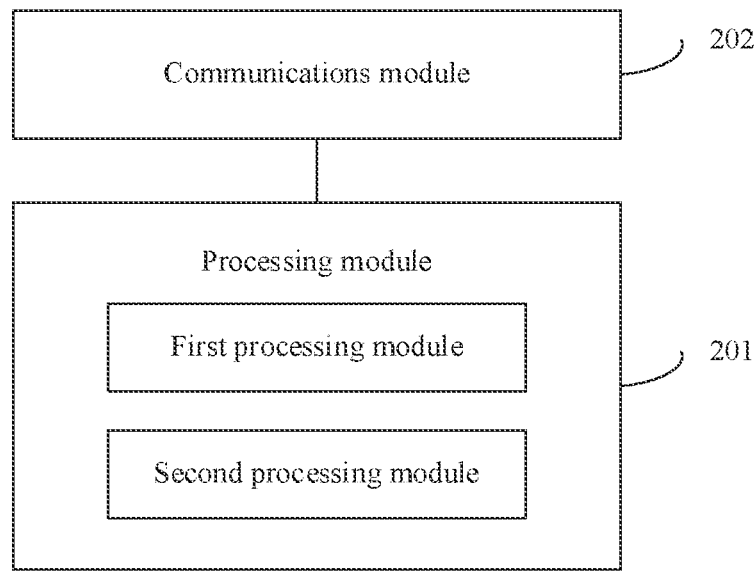
FIG. 16 is a schematic diagram of a structure of a communications apparatus according to an embodiment of this application.

FIG. 16 is a schematic diagram of a structure of a communications apparatus according to an embodiment of this application. As shown in FIG. 16, the communications apparatus includes a processing module 201 and a communications module 202. The processing module 201 may include a first processing module and a second processing module.

Optionally, the communications apparatus may perform at least one of the following solutions:

Solution 1: The first processing module is configured to: when a terminal uses a long DRX cycle, monitor a power saving signal in a first search space, and skip monitoring the power saving signal in a second search space, where the power saving signal is used to indicate power saving information of the terminal. The second processing module is configured to: when the terminal uses a short DRX cycle, monitor the power saving signal in the second search space, and skip monitoring the power saving signal in the first search space.

For related descriptions of the power saving information, the first search space, and the second search space, refer to the embodiment shown in FIG. 5. Details are not described herein again.

Solution 2: The first processing module is configured to: when a terminal uses a long DRX cycle, monitor a power saving signal in a search space based on a first group of configuration parameters of the search space, where the power saving signal is used to indicate power saving information of the terminal. The second processing module is configured to: when the terminal uses a short DRX cycle, monitor the power saving signal in the search space based on a second group of configuration parameters of the search space.

For related descriptions of the power saving information, the search space, the first group of configuration parameters, and the second group of configuration parameters, refer to the embodiment shown in FIG. 9. Details are not described herein again.

In a possible design, the communications module 202 is configured to receive configuration information of the search space, where the configuration information of the search space is used to indicate the first group of configuration parameters and the second group of configuration parameters.

In a possible design, the communications module 202 is configured to: receive configuration information of the search space, and receive indication information. The configuration information of the search space is used to indicate a parameter other than a monitoring cycle and a monitoring offset value in the first group of configuration parameters, and a parameter other than a monitoring cycle and a monitoring offset value in the second group of configuration parameters. The indication information is used to indicate the monitoring cycle and the monitoring offset value in the first group of configuration parameters, and the monitoring cycle and the monitoring offset value in the second group of configuration parameters.

Solution 3: The first processing module is configured to: determine M candidate monitoring occasions of a search space, where M is a positive integer; and determine N target monitoring occasions from the M candidate monitoring occasions based on a time domain location of on duration of a DRX cycle, where N is a positive integer less than or equal to M. The second processing module is configured to monitor a power saving signal on the N target monitoring occasions in the search space, where the power saving signal is used to indicate power saving information of a terminal.

For related information about the power saving signal, the search space, and the target monitoring occasion, refer to the embodiment shown in FIG. 11. Details are not described herein again.

In an example, with reference to the communications apparatus shown in FIG. 4, the communications module 202 in FIG. 16 may be implemented by the communications interface 104 in FIG. 4, and the processing module 201 in FIG. 16 may be implemented by the processor 101 in FIG. 4. This is not limited in this embodiment of this application.

Figure 17:
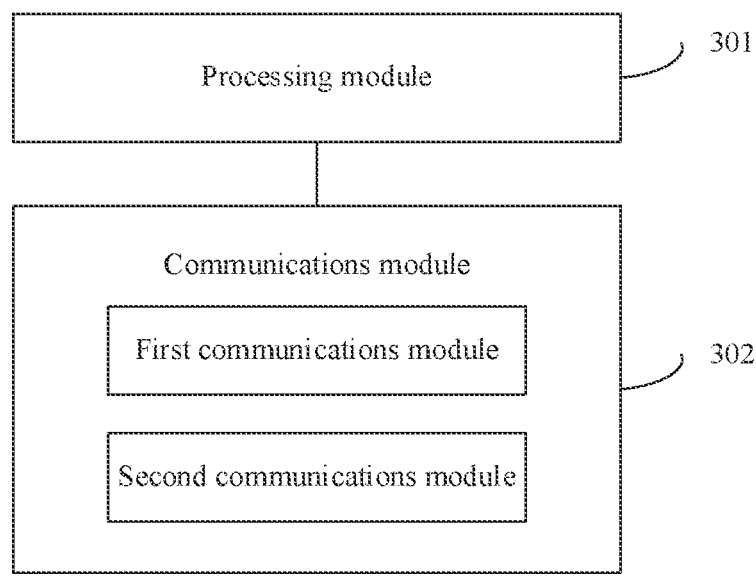
FIG. 17 is a schematic diagram of a structure of a communications apparatus according to an embodiment of this application.

FIG. 17 is a schematic diagram of a structure of a communications apparatus according to an embodiment of this application. As shown in FIG. 17, the communications apparatus includes a processing module 301 and a communications module 302. The communications module 302 may include a first communications module and a second communications module.

Optionally, the communications apparatus may perform at least one of the following solutions:

Solution 1: The first communications module is configured to: when a terminal uses a long DRX cycle, send a power saving signal in a first search space, and skip sending the power saving signal in a second search space, where the power saving signal is used to indicate power saving information of the terminal. The second communications module is configured to: when the terminal uses a short DRX cycle, send the power saving signal in the second search space, and skip sending the power saving signal in the first search space.

For related descriptions of the power saving information, the first search space, and the second search space, refer to the embodiment shown in FIG. 5. Details are not described herein again.

Solution 2: The first communications module is configured to: when a terminal uses a long DRX cycle, send a power saving signal in a search space based on a first group of configuration parameters of the search space, where the power saving signal is used to indicate power saving information of the terminal. The second communications module is configured to: when the terminal uses a short DRX cycle, send the power saving signal in the search space based on a second group of configuration parameters of the search space.

For related descriptions of the power saving information, the search space, the first group of configuration parameters, and the second group of configuration parameters, refer to the embodiment shown in FIG. 9. Details are not described herein again.

In a possible design, the first communications module/the second communications module is further configured to send configuration information of the search space to the terminal, where the configuration information of the search space is used to indicate the first group of configuration parameters and the second group of configuration parameters.

In a possible design, the first communications module/the second communications module is further configured to: send configuration information of the search space to the terminal, and send indication information to the terminal. The configuration information of the search space is used to indicate a parameter other than a monitoring cycle and a monitoring offset value in the first group of configuration parameters, and a parameter other than a monitoring cycle and a monitoring offset value in the second group of configuration parameters. The indication information is used to indicate the monitoring cycle and the monitoring offset value in the first group of configuration parameters, and the monitoring cycle and the monitoring offset value in the second group of configuration parameters.

Solution 3: The processing module 301 is configured to: determine M candidate monitoring occasions of a search space, where M is a positive integer; and determine N target monitoring occasions from the M candidate monitoring occasions based on a time domain location of on duration of a DRX cycle used by a terminal, where N is a positive integer less than or equal to M. The communications module 302 is configured to send a power saving signal on the N target monitoring occasions in the search space, where the power saving signal is used to indicate power saving information of the terminal.

For related information about the power saving signal, the search space, and the target monitoring occasion, refer to the embodiment shown in FIG. 11. Details are not described herein again.

In an example, with reference to the communications apparatus shown in FIG. 4, the communications module 302 in FIG. 17 may be implemented by the communications interface 104 in FIG. 4, and the processing module 301 in FIG. 17 may be implemented by the processor 101 in FIG. 4. This is not limited in this embodiment of this application.

An embodiment of this application further provides a computer-readable storage medium. The computer-readable storage medium stores computer instructions. When the computer-readable storage medium runs on a communications apparatus, the communications apparatus is enabled to perform the method shown in FIG. 5, FIG. 9, or FIG. 11. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line. DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium, a semiconductor medium (for example, a solid-state drive (solid-state drive, SSD)), or the like.

An embodiment of this application further provides a computer program product including computer instructions. When the computer program product is run on a communications apparatus, the communications apparatus is enabled to perform the method shown in FIG. 5, FIG. 9, or FIG. 11.

An embodiment of this application further provides a communications system. The communications system includes a network device and a terminal. The terminal is configured to perform the technical solution shown in FIG. 5, FIG. 9, or FIG. 11, and the network device is configured to perform the technical solution shown in FIG. 5, FIG. 9, or FIG. 11.

Figure 18:
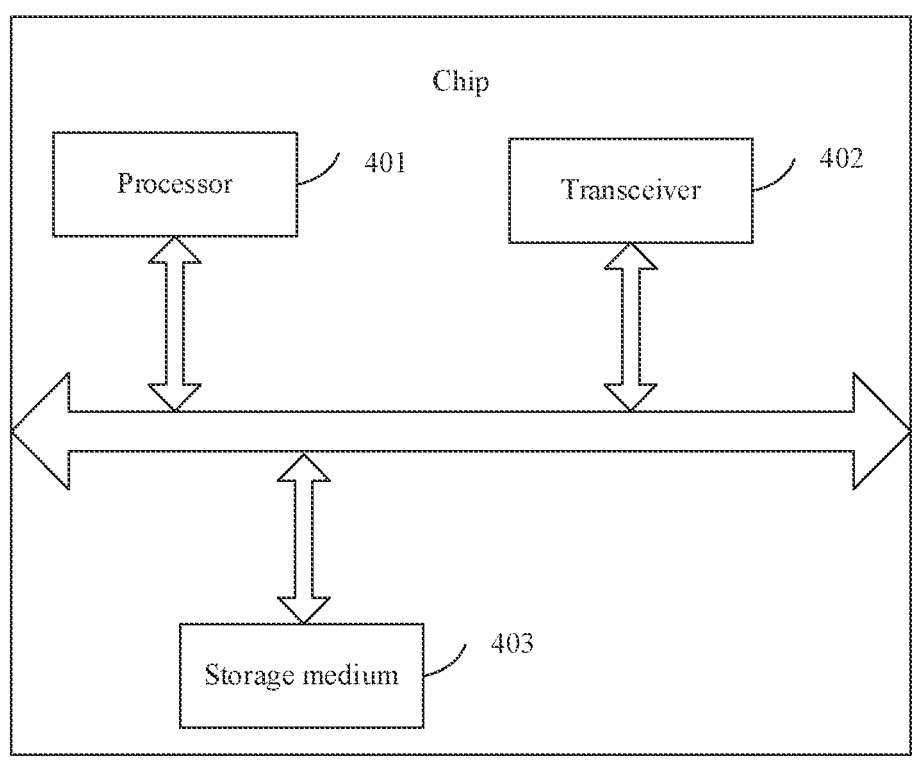
FIG. 18 is a schematic diagram of a structure of a chip according to an embodiment of this application.

FIG. 18 is a schematic diagram of a structure of a chip according to an embodiment of this application. The chip shown in FIG. 18 may be a general-purpose processor, or may be a dedicated processor. The chip includes a processor 401. The processor 401 is configured to support a communications apparatus in performing the technical solution shown in FIG. 5, FIG. 9, or FIG. 11.

Optionally, the chip further includes a transceiver 402. The transceiver 402 is configured to support, under control of the processor 401, a communications apparatus in performing the technical solution shown in FIG. 5. FIG. 9, or FIG. 11.

Optionally, the chip shown in FIG. 18 may further include a storage medium 403.

It should be noted that the chip shown in FIG. 18 may be implemented by the following circuit or component: one or more field programmable gate arrays (field programmable gate array, FPGA), a programmable logic device (programmable logic device, PLD), a controller, a state machine, gate logic, a discrete hardware component, any other appropriate circuit, or any combination of circuits that can perform various functions described in this application.

The terminal, the network device, the computer storage medium, the computer program product, and the chip provided in the embodiments of this application are all configured to perform the methods provided above. Therefore, for beneficial effects that can be achieved by the terminal, the network device, the computer storage medium, the computer program product, and the chip, refer to the beneficial effects corresponding to the methods provided above. Details are not described herein again.

With reference to the foregoing descriptions, this application further provides the following embodiments:

Embodiment 1: A search space monitoring method is provided. The method includes:

When using a long DRX cycle, a terminal monitors a power saving signal in a first search space, and does not monitor the power saving signal in a second search space, where the power saving signal is used to indicate power saving information of the terminal.

When using a short DRX cycle, the terminal monitors the power saving signal in the second search space, and does not monitor the power saving signal in the first search space.

Embodiment 2: According to the search space monitoring method in Embodiment 1, the power saving information includes at least one of the following: whether the terminal monitors a PDCCH in a DRX cycle associated with the power saving signal; a minimum scheduling time interval indication; a CSI measurement trigger indication; a BWP switching indication; a search space and/or a CORESET that the terminal needs to monitor in the DRX cycle associated with the power saving signal; a monitoring cycle in which the terminal monitors the PDCCH in the DRX cycle associated with the power saving signal; and skipping duration used by the terminal in the DRX cycle associated with the power saving signal.

Embodiment 3: According to the search space monitoring method in Embodiment 1 or Embodiment 2, a monitoring cycle of the first search space is the same as the long DRX cycle in terms of a time length, and a monitoring cycle of the second search space is the same as the short DRX cycle in terms of a time length.

Embodiment 4: According to the search space monitoring method according to any one of Embodiment 1 to Embodiment 3, a monitoring offset value of the first search space is different from a monitoring offset value of the second search space.

Embodiment 5: A communications method is provided. The method includes:

When a terminal uses a long DRX cycle, a network device sends a power saving signal in a first search space, and does not send the power saving signal in a second search space, where the power saving signal is used to indicate power saving information of the terminal.

When the terminal uses a short DRX cycle, the network device sends the power saving signal in the second search space, and does not send the power saving signal in the first search space.

Embodiment 6: According to the communications method in Embodiment 5, the power saving information includes at least one of the following: whether the terminal monitors a PDCCH in a DRX cycle associated with the power saving signal; a minimum scheduling time interval indication; a CSI measurement trigger indication; a BWP switching indication; a search space and/or a CORESET that the terminal needs to monitor in the DRX cycle associated with the power saving signal; a monitoring cycle in which the terminal monitors the PDCCH in the DRX cycle associated with the power saving signal; and skipping duration used by the terminal in the DRX cycle associated with the power saving signal.

Embodiment 7: According to the communications method in Embodiment 5 or Embodiment 6, a monitoring cycle of the first search space is the same as the long DRX cycle in terms of a time length, and a monitoring cycle of the second search space is the same as the short DRX cycle in terms of a time length.

Embodiment 8: According to the communications method according to any one of Embodiment 5 to Embodiment 7, a monitoring offset value of the first search space is different from a monitoring offset value of the second search space.

Embodiment 9: A communications apparatus is provided. The communications apparatus may be a terminal, a chip in the terminal, or a system on chip. The communications apparatus includes a processor and a memory. The memory stores instructions. When the instructions are executed by the processor, the communications apparatus is enabled to perform the following steps: when using a long DRX cycle, monitoring a power saving signal in a first search space, and skipping monitoring the power saving signal in a second search space, where the power saving signal is used to indicate power saving information of the terminal; and when using a short DRX cycle, monitoring the power saving signal in the second search space, and skipping monitoring the power saving signal in the first search space.

Embodiment 10: According to the communications apparatus in Embodiment 9, the power saving information includes at least one of the following: whether the terminal monitors a PDCCH in a DRX cycle associated with the power saving signal; a minimum scheduling time interval indication, a CSI measurement trigger indication: a BWP switching indication, a search space and/or a CORESET that the terminal needs to monitor in the DRX cycle associated with the power saving signal; a monitoring cycle in which the terminal monitors the PDCCH in the DRX cycle associated with the power saving signal; and skipping duration used by the terminal in the DRX cycle associated with the power saving signal.

Embodiment 11: According to the communications apparatus in Embodiment 9 or Embodiment 10, a monitoring cycle of the first search space is the same as the long DRX cycle in terms of a time length, and a monitoring cycle of the second search space is the same as the short DRX cycle in terms of a time length.

Embodiment 12: According to the communications apparatus according to any one of Embodiment 9 to Embodiment 11, a monitoring offset value of the first search space is different from a monitoring offset value of the second search space.

Embodiment 13: A communications apparatus is provided. The communications apparatus may be a network device, a chip in the network device, or a system on chip. The communications apparatus includes a processor and a memory. The memory stores instructions. When the instructions are executed by the processor, the communications apparatus is enabled to perform the following steps: when a terminal uses a long DRX cycle, sending a power saving signal in a first search space, and skipping sending the power saving signal in a second search space, where the power saving signal is used to indicate power saving information of the terminal, and when the terminal uses a short DRX cycle, sending the power saving signal in the second search space, and skipping sending the power saving signal in the first search space.

Embodiment 14: According to the communications apparatus in Embodiment 13, the power saving information includes at least one of the following: whether the terminal monitors a PDCCH in a DRX cycle associated with the power saving signal; a minimum scheduling time interval indication; a CSI measurement trigger indication; a BWP switching indication a search space and/or a CORESET that the terminal needs to monitor in the DRX cycle associated with the power saving signal; a monitoring cycle in which the terminal monitors the PDCCH in the DRX cycle associated with the power saving signal; and skipping duration used by the terminal in the DRX cycle associated with the power saving signal.

Embodiment 15: According to the communications apparatus in Embodiment 13 or Embodiment 14, a monitoring cycle of the first search space is the same as the long DRX cycle in terms of a time length, and a monitoring cycle of the second search space is the same as the short DRX cycle in terms of a time length.

Embodiment 16: According to the communications apparatus according to any one of Embodiment 13 to Embodiment 15, a monitoring offset value of the first search space is different from a monitoring offset value of the second search space.

Embodiment 17: A communications apparatus is provided, including a first processing unit and a second processing unit. The first processing module is configured to: when a terminal uses a long DRX cycle, monitor a power saving signal in a first search space, and skip monitoring the power saving signal in a second search space, where the power saving signal is used to indicate power saving information of the terminal. The second processing module is configured to: when the terminal uses a short DRX cycle, monitor the power saving signal in the second search space, and skip monitoring the power saving signal in the first search space.

Embodiment 18: According to the communications apparatus in Embodiment 17, the power saving information includes at least one of the following: whether the terminal monitors a PDCCH in a DRX cycle associated with the power saving signal; a minimum scheduling time interval indication; a CSI measurement trigger indication; a BWP switching indication; a search space and/or a CORESET that the terminal needs to monitor in the DRX cycle associated with the power saving signal; a monitoring cycle in which the terminal monitors the PDCCH in the DRX cycle associated with the power saving signal; and skipping duration used by the terminal in the DRX cycle associated with the power saving signal.

Embodiment 19: According to the communications apparatus in Embodiment 17 or Embodiment 18, a monitoring cycle of the first search space is the same as the long DRX cycle in terms of a time length, and a monitoring cycle of the second search space is the same as the short DRX cycle in terms of a time length.

Embodiment 20: According to the communications apparatus according to any one of Embodiment 17 to Embodiment 19, a monitoring offset value of the first search space is different from a monitoring offset value of the second search space.

Embodiment 21: A communications apparatus is provided, including a first communications module and a second communications module. The first communications module is configured to: when a terminal uses a long DRX cycle, send a power saving signal in a first search space, and skip sending the power saving signal in a second search space, where the power saving signal is used to indicate power saving information of the terminal. The second communications module is configured to: when the terminal uses a short DRX cycle, send the power saving signal in the second search space, and skip sending the power saving signal in the first search space.

Embodiment 22: According to the communications apparatus in Embodiment 21, the power saving information includes at least one of the following: whether the terminal monitors a PDCCH in a DRX cycle associated with the power saving signal; a minimum scheduling time interval indication; a CSI measurement trigger indication; a BWP switching indication: a search space and/or a CORESET that the terminal needs to monitor in the DRX cycle associated with the power saving signal; a monitoring cycle in which the terminal monitors the PDCCH in the DRX cycle associated with the power saving signal; and skipping duration used by the terminal in the DRX cycle associated with the power saving signal.

Embodiment 23: According to the communications apparatus in Embodiment 21 or Embodiment 22, a monitoring cycle of the first search space is the same as the long DRX cycle in terms of a time length, and a monitoring cycle of the second search space is the same as the short DRX cycle in terms of a time length.

Embodiment 24: According to the communications apparatus according to any one of Embodiment 21 to Embodiment 23, a monitoring offset value of the first search space is different from a monitoring offset value of the second search space.

Embodiment 25: A communications system is provided, including a terminal and a network device.

The terminal is configured to: when using a long DRX cycle, monitor a power saving signal in a first search space, and skip monitoring the power saving signal in a second search space, where the power saving signal is used to indicate power saving information of the terminal; and when using a short DRX cycle, monitor the power saving signal in the second search space, and skip monitoring the power saving signal in the first search space.

The network device is configured to: when the terminal uses a long DRX cycle, send a power saving signal in a first search space, and skip sending the power saving signal in a second search space, where the power saving signal is used to indicate power saving information of the terminal; and when the terminal uses a short DRX cycle, send the power saving signal in the second search space, and skip sending the power saving signal in the first search space.

Embodiment 26: According to the communications system in Embodiment 25, the power saving information includes at least one of the following: whether the terminal monitors a PDCCH in a DRX cycle associated with the power saving signal; a minimum scheduling time interval indication; a CSI measurement trigger indication; a BWP switching indication; a search space and/or a CORESET that the terminal needs to monitor in the DRX cycle associated with the power saving signal; a monitoring cycle in which the terminal monitors the PDCCH in the DRX cycle associated with the power saving signal; and skipping duration used by the terminal in the DRX cycle associated with the power saving signal.

Embodiment 27: According to the communications system in Embodiment 25 or Embodiment 26, a monitoring cycle of the first search space is the same as the long DRX cycle in terms of a time length, and a monitoring cycle of the second search space is the same as the short DRX cycle in terms of a time length.

Embodiment 28: According to the communications system according to any one of Embodiment 25 to Embodiment 27, a monitoring offset value of the first search space is different from a monitoring offset value of the second search space.

Embodiment 29: A computer program product is provided. When the computer program product is run on a computer, the computer is enabled to perform the method in any one of Embodiment 1 to Embodiment 8.

Embodiment 30: A computer-readable storage medium is provided. The computer-readable storage medium stores instructions, and when the instructions are run on a computer, the computer is enabled to perform the method in any one of Embodiment 1 to Embodiment 8.

Embodiment 31: A chip is provided. The chip includes a processor, and when the processor executes instructions, the processor is configured to perform the method in any one of Embodiment 1 to Embodiment 8. The instructions may be from a memory inside the chip, or may be from a memory outside the chip. Optionally, the chip further includes an input/output circuit.

Embodiment 32: A search space monitoring method is provided. The method includes:

When using a long DRX cycle, a terminal monitors a power saving signal in a search space based on a first group of configuration parameters of the search space, where the power saving signal is used to indicate power saving information of the terminal.

When using a short DRX cycle, the terminal monitors the power saving signal in the search space based on a second group of configuration parameters of the search space.

Embodiment 33: According to the search space monitoring method in Embodiment 32, the power saving information includes at least one of the following: whether the terminal monitors a PDCCH in a DRX cycle associated with the power saving signal; a minimum scheduling time interval indication; a CSI measurement trigger indication; a BWP switching indication; a search space and/or a CORESET that the terminal needs to monitor in the DRX cycle associated with the power saving signal; a monitoring cycle in which the terminal monitors the PDCCH in the DRX cycle associated with the power saving signal; and skipping duration used by the terminal in the DRX cycle associated with the power saving signal.

Embodiment 34: According to the search space monitoring method in Embodiment 32 or Embodiment 33, the method further includes: The terminal receives configuration information of the search space, where the configuration information of the search space is used to indicate the first group of configuration parameters and the second group of configuration parameters.

Embodiment 35: According to the search space monitoring method in Embodiment 32 or Embodiment 33, the method further includes: The terminal receives configuration information of the search space, where the configuration information of the search space is used to indicate a parameter other than a monitoring cycle and a monitoring offset value in the first group of configuration parameters, and a parameter other than a monitoring cycle and a monitoring offset value in the second group of configuration parameters. The terminal receives indication information, where the indication information is used to indicate the monitoring cycle and the monitoring offset value in the first group of configuration parameters, and the monitoring cycle and the monitoring offset value in the second group of configuration parameters.

Embodiment 36: According to the search space monitoring method in any one of Embodiment 32 to Embodiment 35, the monitoring cycle in the first group of configuration parameters is the same as the long DRX cycle in terms of a time length, and the monitoring cycle in the second group of configuration parameters is the same as the short DRX cycle in terms of a time length.

Embodiment 37: According to the search space monitoring method in any one of Embodiment 32 to Embodiment 36, the monitoring offset value in the first group of configuration parameters is different from the monitoring offset value in the second group of configuration parameters.

Embodiment 38: A communications method is provided. The method includes:

When a terminal uses a long discontinuous reception DRX cycle, a network device sends a power saving signal in a search space based on a first group of configuration parameters of the search space, where the power saving signal is used to indicate power saving information of the terminal.

When the terminal uses a short DRX cycle, the network device sends the power saving signal in the search space based on a second group of configuration parameters of the search space.

Embodiment 39: According to the communications method in Embodiment 38, the power saving information includes at least one of the following: whether the terminal monitors a PDCCH in a DRX cycle associated with the power saving signal; a minimum scheduling time interval indication; a CSI measurement trigger indication; a BWP switching indication; a search space and/or a CORESET that the terminal needs to monitor in the DRX cycle associated with the power saving signal; a monitoring cycle in which the terminal monitors the PDCCH in the DRX cycle associated with the power saving signal; and skipping duration used by the terminal in the DRX cycle associated with the power saving signal.

Embodiment 40: According to the communications method in Embodiment 39 or Embodiment 40, the method further includes: The network device sends configuration information of the search space to the terminal, where the configuration information of the search space is used to indicate the first group of configuration parameters and the second group of configuration parameters.

Embodiment 41: According to the communications method in Embodiment 39 or Embodiment 40, the method further includes: The network device sends configuration information of the search space to the terminal, where the configuration information of the search space is used to indicate a parameter other than a monitoring cycle and a monitoring offset value in the first group of configuration parameters, and a parameter other than a monitoring cycle and a monitoring offset value in the second group of configuration parameters. The network device sends indication information to the terminal, where the indication information is used to indicate the monitoring cycle and the monitoring offset value in the first group of configuration parameters, and the monitoring cycle and the monitoring offset value in the second group of configuration parameters.

Embodiment 42: According to the communications method in any one of Embodiment 38 to Embodiment 41, the monitoring cycle in the first group of configuration parameters is the same as the long DRX cycle in terms of a time length, and the monitoring cycle in the second group of configuration parameters is the same as the short DRX cycle in terms of a time length.

Embodiment 43: According to the communications method in any one of Embodiment 38 to Embodiment 42, the monitoring offset value in the first group of configuration parameters is different from the monitoring offset value in the second group of configuration parameters.

Embodiment 44: A communications apparatus is provided. The communications apparatus may be a terminal, a chip in the terminal, or a system on chip. The communications apparatus includes a processor and a memory. The memory stores instructions. When the instructions are executed by the processor, the communications apparatus is enabled to perform the following steps: when using a long DRX cycle, monitoring a power saving signal in a search space based on a first group of configuration parameters of the search space, where the power saving signal is used to indicate power saving information of the terminal; and when using a short DRX cycle, monitoring the power saving signal in the search space based on a second group of configuration parameters of the search space.

Embodiment 45: According to the communications apparatus in Embodiment 44, the power saving information includes at least one of the following: whether the terminal monitors a PDCCH in a DRX cycle associated with the power saving signal; a minimum scheduling time interval indication; a CSI measurement trigger indication; a BWP switching indication; a search space and/or a CORESET that the terminal needs to monitor in the DRX cycle associated with the power saving signal; a monitoring cycle in which the terminal monitors the PDCCH in the DRX cycle associated with the power saving signal; and skipping duration used by the terminal in the DRX cycle associated with the power saving signal.

Embodiment 46: According to the communications apparatus in Embodiment 44 or Embodiment 45, when the instructions are executed by the processor, the communications apparatus is further enabled to perform the following step: receiving configuration information of the search space, where the configuration information of the search space is used to indicate the first group of configuration parameters and the second group of configuration parameters.

Embodiment 47: According to the communications apparatus in Embodiment 44 or Embodiment 45, when the instructions are executed by the processor, the communications apparatus is further enabled to perform the following steps: receiving configuration information of the search space, where the configuration information of the search space is used to indicate a parameter other than a monitoring cycle and a monitoring offset value in the first group of configuration parameters, and a parameter other than a monitoring cycle and a monitoring offset value in the second group of configuration parameters; and receiving indication information, where the indication information is used to indicate the monitoring cycle and the monitoring offset value in the first group of configuration parameters, and the monitoring cycle and the monitoring offset value in the second group of configuration parameters.

Embodiment 48: According to the communications apparatus in any one of Embodiment 44 to Embodiment 47, the monitoring cycle in the first group of configuration parameters is the same as the long DRX cycle in terms of a time length, and the monitoring cycle in the second group of configuration parameters is the same as the short DRX cycle in terms of a time length.

Embodiment 49: According to the communications apparatus in any one of Embodiment 44 to Embodiment 48, the monitoring offset value in the first group of configuration parameters is different from the monitoring offset value in the second group of configuration parameters.

Embodiment 50: A communications apparatus is provided. The communications apparatus may be a network device, a chip in the network device, or a system on chip. The communications apparatus includes a processor and a memory. The memory stores instructions. When the instructions are executed by the processor, the communications apparatus is enabled to perform the following steps: when a terminal uses a long DRX cycle, sending a power saving signal in a search space based on a first group of configuration parameters of the search space, where the power saving signal is used to indicate power saving information of the terminal; and when the terminal uses a short DRX cycle, sending the power saving signal in the search space based on a second group of configuration parameters of the search space.

Embodiment 51: According to the communications apparatus in Embodiment 50, the power saving information includes at least one of the following: whether the terminal monitors a PDCCH in a DRX cycle associated with the power saving signal; a minimum scheduling time interval indication; a CSI measurement trigger indication; a BWP switching indication; a search space and/or a CORESET that the terminal needs to monitor in the DRX cycle associated with the power saving signal; a monitoring cycle in which the terminal monitors the PDCCH in the DRX cycle associated with the power saving signal; and skipping duration used by the terminal in the DRX cycle associated with the power saving signal.

Embodiment 52: According to the communications apparatus in Embodiment 50 or Embodiment 51, when the instructions are executed by the processor, the communications apparatus is further enabled to perform the following step: sending configuration information of the search space to the terminal, where the configuration information of the search space is used to indicate the first group of configuration parameters and the second group of configuration parameters.

Embodiment 53: According to the communications apparatus in Embodiment 50 or Embodiment 51, when the instructions are executed by the processor, the communications apparatus is further enabled to perform the following steps: sending configuration information of the search space to the terminal, where the configuration information of the search space is used to indicate a parameter other than a monitoring cycle and a monitoring offset value in the first group of configuration parameters, and a parameter other than a monitoring cycle and a monitoring offset value in the second group of configuration parameters; and sending indication information to the terminal, where the indication information is used to indicate the monitoring cycle and the monitoring offset value in the first group of configuration parameters, and the monitoring cycle and the monitoring offset value in the second group of configuration parameters.

Embodiment 54: According to the communications apparatus in any one of Embodiment 50 to Embodiment 53, the monitoring cycle in the first group of configuration parameters is the same as the long DRX cycle in terms of a time length, and the monitoring cycle in the second group of configuration parameters is the same as the short DRX cycle in terms of a time length.

Embodiment 55: According to the communications apparatus in any one of Embodiment 50 to Embodiment 54, the monitoring offset value in the first group of configuration parameters is different from the monitoring offset value in the second group of configuration parameters.

Embodiment 56: A communications apparatus is provided. The communications apparatus includes a first processing module and a second processing module. The first processing module is configured to: when a terminal uses a long DRX cycle, monitor a power saving signal in a search space based on a first group of configuration parameters of the search space, where the power saving signal is used to indicate power saving information of the terminal. The second processing module is configured to: when the terminal uses a short DRX cycle, monitor the power saving signal in the search space based on a second group of configuration parameters of the search space.

Embodiment 57: According to the communications apparatus in Embodiment 56, the power saving information includes at least one of the following: whether the terminal monitors a PDCCH in a DRX cycle associated with the power saving signal; a minimum scheduling time interval indication; a CSI measurement trigger indication; a BWP switching indication; a search space and/or a CORESET that the terminal needs to monitor in the DRX cycle associated with the power saving signal; a monitoring cycle in which the terminal monitors the PDCCH in the DRX cycle associated with the power saving signal; and skipping duration used by the terminal in the DRX cycle associated with the power saving signal.

Embodiment 58: According to the communications apparatus in Embodiment 56 or Embodiment 57, the communications apparatus further includes a communications module. The communications module is configured to receive configuration information of the search space, where the configuration information of the search space is used to indicate the first group of configuration parameters and the second group of configuration parameters.

Embodiment 59: According to the communications apparatus in Embodiment 56 or Embodiment 57, the communications apparatus further includes a communications module. The communications module is configured to: receive configuration information of the search space, and receive indication information. The configuration information of the search space is used to indicate a parameter other than a monitoring cycle and a monitoring offset value in the first group of configuration parameters, and a parameter other than a monitoring cycle and a monitoring offset value in the second group of configuration parameters. The indication information is used to indicate the monitoring cycle and the monitoring offset value in the first group of configuration parameters, and the monitoring cycle and the monitoring offset value in the second group of configuration parameters.

Embodiment 60: According to the communications apparatus in any one of Embodiment 56 to Embodiment 59, the monitoring cycle in the first group of configuration parameters is the same as the long DRX cycle in terms of a time length, and the monitoring cycle in the second group of configuration parameters is the same as the short DRX cycle in terms of a time length.

Embodiment 61: According to the communications apparatus in any one of Embodiment 56 to Embodiment 60, the monitoring offset value in the first group of configuration parameters is different from the monitoring offset value in the second group of configuration parameters.

Embodiment 62: A communications apparatus is provided. The communications apparatus includes a first communications module and a second communications module. The first communications module is configured to: when a terminal uses a long DRX cycle, send a power saving signal in a search space based on a first group of configuration parameters of the search space, where the power saving signal is used to indicate power saving information of the terminal. The second communications module is configured to: when the terminal uses a short DRX cycle, send the power saving signal in the search space based on a second group of configuration parameters of the search space.

Embodiment 63: According to the communications apparatus in Embodiment 62, the power saving information includes at least one of the following: whether the terminal monitors a PDCCH in a DRX cycle associated with the power saving signal; a minimum scheduling time interval indication; a CSI measurement trigger indication; a BWP switching indication; a search space and/or a CORESET that the terminal needs to monitor in the DRX cycle associated with the power saving signal; a monitoring cycle in which the terminal monitors the PDCCH in the DRX cycle associated with the power saving signal; and skipping duration used by the terminal in the DRX cycle associated with the power saving signal.

Embodiment 64: According to the communications apparatus in Embodiment 62 or Embodiment 63, the first communications module/the second communications module is further configured to send configuration information of the search space to the terminal, where the configuration information of the search space is used to indicate the first group of configuration parameters and the second group of configuration parameters.

Embodiment 65: According to the communications apparatus in Embodiment 62 or Embodiment 63, the first communications module/the second communications module is further configured to: send configuration information of the search space to the terminal, and send indication information to the terminal. The configuration information of the search space is used to indicate a parameter other than a monitoring cycle and a monitoring offset value in the first group of configuration parameters, and a parameter other than a monitoring cycle and a monitoring offset value in the second group of configuration parameters. The indication information is used to indicate the monitoring cycle and the monitoring offset value in the first group of configuration parameters, and the monitoring cycle and the monitoring offset value in the second group of configuration parameters.

Embodiment 66: According to the communications apparatus in any one of Embodiment 62 to Embodiment 65, the monitoring cycle in the first group of configuration parameters is the same as the long DRX cycle in terms of a time length, and the monitoring cycle in the second group of configuration parameters is the same as the short DRX cycle in terms of a time length.

Embodiment 67: According to the communications apparatus in any one of Embodiment 62 to Embodiment 66, the monitoring offset value in the first group of configuration parameters is different from the monitoring offset value in the second group of configuration parameters.

Embodiment 68: A communications system is provided, including a terminal and a network device.

The terminal is configured to: when using a long DRX cycle, monitor a power saving signal in a search space based on a first group of configuration parameters of the search space, where the power saving signal is used to indicate power saving information of the terminal; and when using a short DRX cycle, monitor the power saving signal in the search space based on a second group of configuration parameters of the search space.

The network device is configured to: when the terminal uses a long discontinuous reception DRX cycle, send a power saving signal in a search space based on a first group of configuration parameters of the search space, where the power saving signal is used to indicate power saving information of the terminal; and when the terminal uses a short DRX cycle, send the power saving signal in the search space based on a second group of configuration parameters of the search space.

Embodiment 69: According to the communications system in Embodiment 68, the power saving information includes at least one of the following: whether the terminal monitors a PDCCH in a DRX cycle associated with the power saving signal; a minimum scheduling time interval indication; a CSI measurement trigger indication; a BWP switching indication; a search space and/or a CORESET that the terminal needs to monitor in the DRX cycle associated with the power saving signal; a monitoring cycle in which the terminal monitors the PDCCH in the DRX cycle associated with the power saving signal; and skipping duration used by the terminal in the DRX cycle associated with the power saving signal.

Embodiment 70: According to the communications system in Embodiment 68 or Embodiment 69, the network device is further configured to send configuration information of the search space to the terminal, where the configuration information of the search space is used to indicate the first group of configuration parameters and the second group of configuration parameters. The terminal is further configured to receive configuration information of the search space, where the configuration information of the search space is used to indicate the first group of configuration parameters and the second group of configuration parameters.

Embodiment 71: According to the communications system in Embodiment 68 or Embodiment 69, the network device is further configured to: send configuration information of the search space to the terminal, where the configuration information of the search space is used to indicate a parameter other than a monitoring cycle and a monitoring offset value in the first group of configuration parameters, and a parameter other than a monitoring cycle and a monitoring offset value in the second group of configuration parameters; and send indication information to the terminal, where the indication information is used to indicate the monitoring cycle and the monitoring offset value in the first group of configuration parameters, and the monitoring cycle and the monitoring offset value in the second group of configuration parameters. The terminal is further configured to: receive configuration information of the search space, where the configuration information of the search space is used to indicate a parameter other than a monitoring cycle and a monitoring offset value in the first group of configuration parameters, and a parameter other than a monitoring cycle and a monitoring offset value in the second group of configuration parameters; and receive indication information, where the indication information is used to indicate the monitoring cycle and the monitoring offset value in the first group of configuration parameters, and the monitoring cycle and the monitoring offset value in the second group of configuration parameters.

Embodiment 72: According to the communications system in any one of Embodiment 68 to Embodiment 71, the monitoring cycle in the first group of configuration parameters is the same as the long DRX cycle in terms of a time length, and the monitoring cycle in the second group of configuration parameters is the same as the short DRX cycle in terms of a time length.

Embodiment 73: According to the communications system in any one of Embodiment 68 to Embodiment 72, the monitoring offset value in the first group of configuration parameters is different from the monitoring offset value in the second group of configuration parameters.

Embodiment 74: A computer program product is provided. When the computer program product is run on a computer, the computer is enabled to perform the method in any one of Embodiment 32 to Embodiment 43.

Embodiment 75: A computer-readable storage medium is provided. The computer-readable storage medium stores instructions, and when the instructions are run on a computer, the computer is enabled to perform the method in any one of Embodiment 32 to Embodiment 43.

Embodiment 76: A chip is provided. The chip includes a processor, and when the processor executes instructions, the processor is configured to perform the method in any one of Embodiment 32 to Embodiment 43. The instructions may be from a memory inside the chip, or may be from a memory outside the chip. Optionally, the chip further includes an input/output circuit.

Embodiment 77: A search space monitoring method is provided. The method includes:

A terminal determines M candidate monitoring occasions of a search space, where M is a positive integer.

The terminal determines N target monitoring occasions from the M candidate monitoring occasions based on a time domain location of on duration of a discontinuous reception DRX cycle, where N is a positive integer less than or equal to M.

The terminal monitors a power saving signal on the N target monitoring occasions in the search space, where the power saving signal is used to indicate power saving information of the terminal.

Embodiment 78: According to the search space monitoring method in Embodiment 77, a monitoring cycle of the search space is the same as a short DRX cycle in terms of a time length.

Embodiment 79: According to the search space monitoring method in Embodiment 77 or Embodiment 78, the target monitoring occasion is before the on duration of the DRX cycle, and is closest to the on duration of the DRX cycle.

Embodiment 80: According to the search space monitoring method in Embodiment 77, the N target monitoring occasions are N candidate monitoring occasions that are in the M candidate monitoring occasions and that are closest to the on duration of the DRX cycle; and for each of the M candidate monitoring occasions, a difference between a start time of the candidate monitoring occasion and a start time of the DRX cycle is greater than or equal to a first preset value.

Embodiment 81: According to the search space monitoring method in Embodiment 80, a value of N is preset, or is configured by a network device for the terminal.

Embodiment 82: According to the search space monitoring method in Embodiment 77, the N target monitoring occasions are N candidate monitoring occasions in a time window, a difference between a start time of the time window and a start time of the on duration of the DRX cycle is equal to a second preset value, and a difference between an end time of the time window and the start time of the on duration of the DRX cycle is equal to a third preset value.

Embodiment 83: According to the search space monitoring method in any one of Embodiment 77 to Embodiment 82, the power saving information includes at least one of the following: whether the terminal monitors a PDCCH in a DRX cycle associated with the power saving signal; a minimum scheduling time interval indication; a CSI measurement trigger indication; a BWP switching indication; a search space and/or a CORESET that the terminal needs to monitor in the DRX cycle associated with the power saving signal; a monitoring cycle in which the terminal monitors the PDCCH in the DRX cycle associated with the power saving signal; and skipping duration used by the terminal in the DRX cycle associated with the power saving signal.

Embodiment 84: A communications method is provided. The method includes:

A network device determines M candidate monitoring occasions of a search space, where M is a positive integer.

The network device determines N target monitoring occasions from the M candidate monitoring occasions based on a time domain location of on duration of a discontinuous reception DRX cycle, where N is a positive integer less than or equal to M.

The network device sends a power saving signal on the N target monitoring occasions in the search space, where the power saving signal is used to indicate power saving information of a terminal.

Embodiment 85: According to the communications method in Embodiment 84, a monitoring cycle of the search space is the same as a short DRX cycle in terms of a time length.

Embodiment 86: According to the communications method in Embodiment 84 or Embodiment 85, the target monitoring occasion is before the on duration of the DRX cycle, and is closest to the on duration of the DRX cycle.

Embodiment 87: According to the communications method in Embodiment 84, the N target monitoring occasions are N candidate monitoring occasions that are in the M candidate monitoring occasions and that are closest to the on duration of the DRX cycle; and for each of the M candidate monitoring occasions, a difference between a start time of the candidate monitoring occasion and a start time of the DRX cycle is greater than or equal to a first preset value.

Embodiment 88: According to the communications method in Embodiment 87, a value of N is preset, or is configured by the network device for the terminal.

Embodiment 89: According to the communications method in Embodiment 84, the N target monitoring occasions are N candidate monitoring occasions in a time window, a difference between a start time of the time window and a start time of the on duration of the DRX cycle is equal to a second preset value, and a difference between an end time of the time window and the start time of the on duration of the DRX cycle is equal to a third preset value.

Embodiment 90: According to the communications method in any one of Embodiment 84 to Embodiment 89, the power saving information includes at least one of the following: whether the terminal monitors a PDCCH in a DRX cycle associated with the power saving signal; a minimum scheduling time interval indication; a CSI measurement trigger indication; a BWP switching indication; a search space and/or a CORESET that the terminal needs to monitor in the DRX cycle associated with the power saving signal; a monitoring cycle in which the terminal monitors the PDCCH in the DRX cycle associated with the power saving signal; and skipping duration used by the terminal in the DRX cycle associated with the power saving signal.

Embodiment 91: A communications apparatus is provided. The communications apparatus may be a terminal, a chip in the terminal, or a system on chip. The communications apparatus includes a processor and a memory. The memory stores instructions. When the instructions are executed by the processor, the communications apparatus is enabled to perform the following steps: determining M candidate monitoring occasions of a search space, where M is a positive integer; determining N target monitoring occasions from the M candidate monitoring occasions based on a time domain location of on duration of a DRX cycle, where N is a positive integer less than or equal to M; and monitoring a power saving signal on the N target monitoring occasions in the search space, where the power saving signal is used to indicate power saving information of the terminal.

Embodiment 92: According to the communications apparatus in Embodiment 91, a monitoring cycle of the search space is the same as a short DRX cycle in terms of a time length.

Embodiment 93: According to the communications apparatus in Embodiment 91 or Embodiment 92, the target monitoring occasion is before the on duration of the DRX cycle, and is closest to the on duration of the DRX cycle.

Embodiment 94: According to the communications apparatus in Embodiment 91, the N target monitoring occasions are N candidate monitoring occasions that are in the M candidate monitoring occasions and that are closest to the on duration of the DRX cycle; and for each of the M candidate monitoring occasions, a difference between a start time of the candidate monitoring occasion and a start time of the DRX cycle is greater than or equal to a first preset value.

Embodiment 95: According to the communications apparatus in Embodiment 94, a value of N is preset, or is configured by a network device for the terminal.

Embodiment 96: According to the communications apparatus in Embodiment 91, the N target monitoring occasions are N candidate monitoring occasions in a time window, a difference between a start time of the time window and a start time of the on duration of the DRX cycle is equal to a second preset value, and a difference between an end time of the time window and the start time of the on duration of the DRX cycle is equal to a third preset value.

Embodiment 97: According to the communications apparatus in any one of Embodiment 91 to Embodiment 96, the power saving information includes at least one of the following: whether the terminal monitors a PDCCH in a DRX cycle associated with the power saving signal; a minimum scheduling time interval indication; a CSI measurement trigger indication; a BWP switching indication; a search space and/or a CORESET that the terminal needs to monitor in the DRX cycle associated with the power saving signal; a monitoring cycle in which the terminal monitors the PDCCH in the DRX cycle associated with the power saving signal; and skipping duration used by the terminal in the DRX cycle associated with the power saving signal.

Embodiment 98: A communications apparatus is provided. The communications apparatus may be a network device, a chip in the network device, or a system on chip. The communications apparatus includes a processor and a memory. The memory stores instructions. When the instructions are executed by the processor, the communications apparatus is enabled to perform the following steps: determining M candidate monitoring occasions of a search space, where M is a positive integer; determining N target monitoring occasions from the M candidate monitoring occasions based on a time domain location of on duration of a DRX cycle used by a terminal, where N is a positive integer less than or equal to M; and sending a power saving signal on the N target monitoring occasions in the search space, where the power saving signal is used to indicate power saving information of the terminal.

Embodiment 99: According to the communications apparatus in Embodiment 98, a monitoring cycle of the search space is the same as a short DRX cycle in terms of a time length.

Embodiment 100: According to the communications apparatus in Embodiment 98 or Embodiment 99, the target monitoring occasion is before the on duration of the DRX cycle, and is closest to the on duration of the DRX cycle.

Embodiment 101: According to the communications apparatus in Embodiment 98, the N target monitoring occasions are N candidate monitoring occasions that are in the M candidate monitoring occasions and that are closest to the on duration of the DRX cycle; and for each of the M candidate monitoring occasions, a difference between a start time of the candidate monitoring occasion and a start time of the DRX cycle is greater than or equal to a first preset value.

Embodiment 102: According to the communications apparatus in Embodiment 101, a value of N is preset, or is configured by the network device for the terminal.

Embodiment 103: According to the communications apparatus in Embodiment 98, the N target monitoring occasions are N candidate monitoring occasions in a time window, a difference between a start time of the time window and a start time of the on duration of the DRX cycle is equal to a second preset value, and a difference between an end time of the time window and the start time of the on duration of the DRX cycle is equal to a third preset value.

Embodiment 104: According to the communications apparatus in any one of Embodiment 98 to Embodiment 103, the power saving information includes at least one of the following: whether the terminal monitors a PDCCH in a DRX cycle associated with the power saving signal; a minimum scheduling time interval indication; a CSI measurement trigger indication; a BWP switching indication; a search space and/or a CORESET that the terminal needs to monitor in the DRX cycle associated with the power saving signal; a monitoring cycle in which the terminal monitors the PDCCH in the DRX cycle associated with the power saving signal; and skipping duration used by the terminal in the DRX cycle associated with the power saving signal.

Embodiment 105: A communications apparatus is provided. The communications apparatus includes a first processing module and a second processing module. The first processing module is configured to: determine M candidate monitoring occasions of a search space, where M is a positive integer; and determine N target monitoring occasions from the M candidate monitoring occasions based on a time domain location of on duration of a DRX cycle, where N is a positive integer less than or equal to M. The second processing module is configured to monitor a power saving signal on the N target monitoring occasions in the search space, where the power saving signal is used to indicate power saving information of a terminal.

Embodiment 106: According to the communications apparatus in Embodiment 105, a monitoring cycle of the search space is the same as a short DRX cycle in terms of a time length.

Embodiment 107: According to the communications apparatus in Embodiment 105 or Embodiment 106, the target monitoring occasion is before the on duration of the DRX cycle, and is closest to the on duration of the DRX cycle.

Embodiment 108: According to the communications apparatus in Embodiment 105, the N target monitoring occasions are N candidate monitoring occasions that are in the M candidate monitoring occasions and that are closest to the on duration of the DRX cycle; and for each of the M candidate monitoring occasions, a difference between a start time of the candidate monitoring occasion and a start time of the DRX cycle is greater than or equal to a first preset value.

Embodiment 109: According to the communications apparatus in Embodiment 108, a value of N is preset, or is configured by a network device for the terminal.

Embodiment 110: According to the communications apparatus in Embodiment 105, the N target monitoring occasions are N candidate monitoring occasions in a time window, a difference between a start time of the time window and a start time of the on duration of the DRX cycle is equal to a second preset value, and a difference between an end time of the time window and the start time of the on duration of the DRX cycle is equal to a third preset value.

Embodiment 111: According to the communications apparatus in any one of Embodiment 105 to Embodiment 110, the power saving information includes at least one of the following: whether the terminal monitors a PDCCH in a DRX cycle associated with the power saving signal; a minimum scheduling time interval indication; a CSI measurement trigger indication; a BWP switching indication; a search space and/or a CORESET that the terminal needs to monitor in the DRX cycle associated with the power saving signal; a monitoring cycle in which the terminal monitors the PDCCH in the DRX cycle associated with the power saving signal; and skipping duration used by the terminal in the DRX cycle associated with the power saving signal.

Embodiment 112: A communications apparatus is provided. The communications apparatus includes a processing module and a communications module. The processing module is configured to: determine M candidate monitoring occasions of a search space, where M is a positive integer; and determine N target monitoring occasions from the M candidate monitoring occasions based on a time domain location of on duration of a DRX cycle used by a terminal, where N is a positive integer less than or equal to M. The communications module is configured to send a power saving signal on the N target monitoring occasions in the search space, where the power saving signal is used to indicate power saving information of the terminal.

Embodiment 113: According to the communications apparatus in Embodiment 112, a monitoring cycle of the search space is the same as a short DRX cycle in terms of a time length.

Embodiment 114: According to the communications apparatus in Embodiment 112 or Embodiment 113, the target monitoring occasion is before the on duration of the DRX cycle, and is closest to the on duration of the DRX cycle.

Embodiment 115: According to the communications apparatus in Embodiment 112, the N target monitoring occasions are N candidate monitoring occasions that are in the M candidate monitoring occasions and that are closest to the on duration of the DRX cycle; and for each of the M candidate monitoring occasions, a difference between a start time of the candidate monitoring occasion and a start time of the DRX cycle is greater than or equal to a first preset value.

Embodiment 116: According to the communications apparatus in Embodiment 115, a value of N is preset, or is configured by a network device for the terminal.

Embodiment 117: According to the communications apparatus in Embodiment 112, the N target monitoring occasions are N candidate monitoring occasions in a time window, a difference between a start time of the time window and a start time of the on duration of the DRX cycle is equal to a second preset value, and a difference between an end time of the time window and the start time of the on duration of the DRX cycle is equal to a third preset value.

Embodiment 118: According to the communications apparatus in any one of Embodiment 112 to Embodiment 117, the power saving information includes at least one of the following: whether the terminal monitors a PDCCH in a DRX cycle associated with the power saving signal; a minimum scheduling time interval indication; a CSI measurement trigger indication; a BWP switching indication; a search space and/or a CORESET that the terminal needs to monitor in the DRX cycle associated with the power saving signal; a monitoring cycle in which the terminal monitors the PDCCH in the DRX cycle associated with the power saving signal; and skipping duration used by the terminal in the DRX cycle associated with the power saving signal.

Embodiment 119: A communications system is provided, including a terminal and a network device.

The terminal is configured to: determine M candidate monitoring occasions of a search space, where M is a positive integer; determine N target monitoring occasions from the M candidate monitoring occasions based on a time domain location of on duration of a discontinuous reception DRX cycle, where N is a positive integer less than or equal to M; and monitor a power saving signal on the N target monitoring occasions in the search space, where the power saving signal is used to indicate power saving information of the terminal.

The network device is configured to: determine M candidate monitoring occasions of a search space, where M is a positive integer; determine N target monitoring occasions from the M candidate monitoring occasions based on a time domain location of on duration of a discontinuous reception DRX cycle, where N is a positive integer less than or equal to M; and send a power saving signal on the N target monitoring occasions in the search space, where the power saving signal is used to indicate power saving information of the terminal.

Embodiment 120: According to the communications system in Embodiment 119, a monitoring cycle of the search space is the same as a short DRX cycle in terms of a time length.

Embodiment 121: According to the communications system in Embodiment 119 or Embodiment 120, the target monitoring occasion is before the on duration of the DRX cycle, and is closest to the on duration of the DRX cycle.

Embodiment 122: According to the communications apparatus in Embodiment 119, the N target monitoring occasions are N candidate monitoring occasions that are in the M candidate monitoring occasions and that are closest to the on duration of the DRX cycle; and for each of the M candidate monitoring occasions, a difference between a start time of the candidate monitoring occasion and a start time of the DRX cycle is greater than or equal to a first preset value.

Embodiment 123: According to the communications system in Embodiment 122, a value of N is preset, or is configured by the network device for the terminal.

Embodiment 124: According to the communications system in Embodiment 119, the N target monitoring occasions are N candidate monitoring occasions in a time window, a difference between a start time of the time window and a start time of the on duration of the DRX cycle is equal to a second preset value, and a difference between an end time of the time window and the start time of the on duration of the DRX cycle is equal to a third preset value.

Embodiment 125: According to the communications system in any one of Embodiment 119 to Embodiment 124, the power saving information includes at least one of the following: whether the terminal monitors a PDCCH in a DRX cycle associated with the power saving signal; a minimum scheduling time interval indication; a CSI measurement trigger indication; a BWP switching indication; a search space and/or a CORESET that the terminal needs to monitor in the DRX cycle associated with the power saving signal; a monitoring cycle in which the terminal monitors the PDCCH in the DRX cycle associated with the power saving signal; and skipping duration used by the terminal in the DRX cycle associated with the power saving signal.

Embodiment 126: A computer program product is provided. When the computer program product is run on a computer, the computer is enabled to perform the method in any one of Embodiment 77 to Embodiment 90.

Embodiment 127: A computer-readable storage medium is provided. The computer-readable storage medium stores instructions, and when the instructions are run on a computer, the computer is enabled to perform the method in any one of Embodiment 77 to Embodiment 90.

Embodiment 128: A chip is provided. The chip includes a processor, and when the processor executes instructions, the processor is configured to perform the method in any one of Embodiment 77 to Embodiment 90. The instructions may be from a memory inside the chip, or may be from a memory outside the chip. Optionally, the chip further includes an input/output circuit.

Although this application is described with reference to the embodiments, a person skilled in the art may understand and implement another variation of the disclosed embodiments by viewing the accompanying drawings, disclosed content, and the appended claims. In the claims, "comprising" (comprising) does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

What is claimed is:

1. A search space monitoring method implemented by a terminal, wherein the search space monitoring method comprises:
   determining M candidate monitoring occasions of a search space, wherein M is a positive integer;
   determining N target monitoring occasions from the M candidate monitoring occasions based on a time domain location of an on duration of a discontinuous reception (DRX) cycle,
wherein N is a positive integer less than or equal to M, wherein the N target monitoring occasions are N candidate monitoring occasions in a time window, wherein a first difference between a start time of the time window and a start time of the on duration is equal to a second preset value, and
wherein a second difference between an end time of the time window and the start time of the on duration is equal to a third preset value; and
   monitoring, on the N target monitoring occasions, a power saving signal indicating power saving information of the terminal.

2. The search space monitoring method of claim 1, wherein the time window is located before an active period of the DRX cycle.

3. The search space monitoring method of claim 1, wherein the second preset value is from a network device, and wherein the search space monitoring method further comprises negotiating, with the network device, to determine the third preset value.

4. The search space monitoring method of claim 1, wherein the power saving information indicates whether the terminal monitors a physical downlink control channel (PDCCH) in the DRX cycle.

5. The search space monitoring method of claim 4, wherein the PDCCH comprises:
   a first PDCCH carrying downlink control information (DCI) formats 0-0, DCI formats 0-1, DCI formats 1-0, and DCI formats 1-1; and
   a second PDCCH carrying DCI format 2-0, DCI format 2-1, DCI format 2-2, or DCI format 2-3.

6. A communications method implemented by a network device, wherein the communications method comprises:
   determining M candidate monitoring occasions of a search space, wherein M is a positive integer;
   determining N target monitoring occasions from the M candidate monitoring occasions based on a time domain location of an on duration of a discontinuous reception (DRX) cycle,
wherein N is a positive integer less than or equal to M, wherein the N targeting monitoring occasions are N candidate monitoring occasions in a time window, wherein a first difference between a start time of the time window and a start time of the on duration is equal to a second preset value, and wherein a second difference between an end time of the time window and the start time of the on duration is equal to a third preset value; and
   sending, on the N target monitoring occasions, a power saving signal indicating power saving information of a terminal.

7. The communications method of claim 6, wherein the time window is located before an active period of the DRX cycle.

8. The communications method of claim 6, further comprising:
   preconfiguring the second preset value for the terminal; and
   negotiating, with the terminal, to determine the third preset value.

9. The communications method of claim 6, wherein the power saving information indicates whether the terminal monitors a physical downlink control channel (PDCCH) in the DRX cycle.

10. The communications method of claim 9, wherein the PDCCH comprises:
   a first PDCCH carrying DCI formats 0-0, DCI formats 0-1, DCI formats 1-0, and DCI formats 1-1; and
   a second PDCCH carrying DCI format 2-0, DCI format 2-1, DCI format 2-2, or DCI format 2-3.

11. A terminal device comprising:
   a memory configured to store a computer program comprising instructions; and
   one or more processors coupled to the memory, wherein when executed by the one or more processors, the instructions cause the terminal device to:

determine M candidate monitoring occasions of a search space, wherein M is a positive integer;

determine N target monitoring occasions from the M candidate monitoring occasions based on a time domain location of an on duration of a discontinuous reception (DRX) cycle, wherein N is a positive integer less than or equal to M, wherein the N targeting monitoring occasions are N candidate monitoring occasions in a time window, wherein a first difference between a start time of the time window and a start time of the on duration is equal to a second preset value, and wherein a second difference between an end time of the time window and the start time of the on duration is equal to a third preset value; and monitor, on the N target monitoring occasions, a power saving signal indicating power saving information of the terminal device.

12. The terminal device of claim 11, wherein the time window is located before an active period of the DRX cycle.

13. The terminal device of claim 11, wherein the second preset value is from a network device, and wherein when executed by the one or more processors, the instructions further cause the terminal device to negotiate, with the network device, to determine the third preset value.

14. The terminal device of claim 11, wherein the power saving information indicates whether the terminal device monitors a physical downlink control channel (PDCCH) in the DRX cycle.

15. The terminal device of claim 14, wherein the PDCCH comprises:
a first PDCCH carrying DCI formats 0-0, DCI formats 0-1, DCI formats 1-0, and DCI formats 1-1; and
a second PDCCH carrying DCI format 2-0, DCI format 2-1, DCI format 2-2, or DCI format 2-3.

16. A network device comprising:
a memory configured to store a computer program comprising instructions; and
one or more processors coupled to the memory, wherein when executed by the one or more processors, the instructions cause the network device to:

determine M candidate monitoring occasions of a search space, wherein M is a positive integer;

determine N target monitoring occasions from the M candidate monitoring occasions based on a time domain location of an on duration of a discontinuous reception (DRX) cycle, wherein N is a positive integer less than or equal to M, wherein the N target monitoring occasions are N candidate monitoring occasions in a time window, wherein a first difference between a start time of the time window and a start time of the on duration is equal to a second preset value, and wherein a second difference between an end time of the time window and the start time of the on duration is equal to a third preset value; and send, on the N target monitoring occasions, a power saving signal indicating power saving information of a terminal device.

17. The network device of claim 16, wherein the time window is located before an active period of the DRX cycle.

18. The network device of claim 16, wherein when executed by the one or more processors, the instructions further cause the network device to:

preconfigure the second preset value for the terminal device; and negotiate, with the terminal device, to determine the third preset value.

19. The network device of claim 16, wherein the power saving information indicates whether the terminal device monitors a physical downlink control channel (PDCCH) in the DRX cycle.

20. The network device of claim 19, wherein the PDCCH comprises:
a first PDCCH carrying DCI formats 0-0, DCI formats 0-1, DCI formats 1-0, and DCI formats 1-1; and
a second PDCCH carrying DCI format 2-0, DCI format 2-1, DCI format 2-2, or DCI format 2-3.

* * * * *